US011137286B2

(12) United States Patent
Cho

(10) Patent No.: US 11,137,286 B2
(45) Date of Patent: Oct. 5, 2021

(54) FILTER ARRAY, SPECTRAL DETECTOR INCLUDING THE FILTER ARRAY AND SPECTROMETER EMPLOYING THE SPECTRAL DETECTOR

(71) Applicant: SAMSUNG ELECTRONICS CO., LTD., Suwon-si (KR)

(72) Inventor: Kyungsang Cho, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 389 days.

(21) Appl. No.: 15/888,754

(22) Filed: Feb. 5, 2018

(65) Prior Publication Data

US 2019/0086259 A1 Mar. 21, 2019

(30) Foreign Application Priority Data

Sep. 15, 2017 (KR) .................. 10-2017-0118834

(51) Int. Cl.
*G01J 3/02* (2006.01)
*G01J 3/28* (2006.01)
(Continued)

(52) U.S. Cl.
CPC .......... *G01J 3/0229* (2013.01); *G01J 3/0291* (2013.01); *G01J 3/2803* (2013.01); *G01J 3/51* (2013.01);
(Continued)

(58) Field of Classification Search
CPC .... G01J 3/0229; G01J 3/51; G01J 2003/2806; G01J 3/0205; G01J 3/42; G01J 3/2803;
(Continued)

(56) References Cited

U.S. PATENT DOCUMENTS 7,280,230 B2 10/2007 Shchegrov et al.
7,965,034 B2 6/2011 Chae et al.
(Continued)

FOREIGN PATENT DOCUMENTS

JP 2006-512561 A 4/2006
JP 2011-209395 A 10/2011
(Continued)

OTHER PUBLICATIONS

Communication dated Nov. 6, 2018, issued by the European Patent Office in counterpart European Application No. 18167294.0.
(Continued)

*Primary Examiner* — Dominic J Bologna
(74) *Attorney, Agent, or Firm* — Sughrue Mion, PLLC

(57) ABSTRACT

Provided are a filter array, a spectral detector including the filter array, and a spectrometer employing the spectral detector. The filter array may have a multi-array structure including a plurality of filter arrays. The filter array may include a first filter array having a first structure in which a plurality of first filters with different transmittance spectrums are arranged, and a second filter array having a second structure in which a plurality of second filters with different transmittance spectrums are arranged, the second filter array being arranged to at least partially overlap the first filter array at a first position relative to the first filter array so that the multi-arrangement type filter array has a first set of absorbance characteristics. The second filter array may be configurable to be arranged to at least partially overlap the first filter array at a second position relative to the first filter array so that the multi-arrangement type filter array has a second set of absorbance characteristics different from the first set of absorbance characteristics.

23 Claims, 24 Drawing Sheets

(51) Int. Cl.
  *G02B 5/20* (2006.01)
  *G01J 3/51* (2006.01)
  *G01J 3/12* (2006.01)

(52) U.S. Cl.
  CPC .............. *G02B 5/201* (2013.01); *G02B 5/206* (2013.01); *G01J 2003/1217* (2013.01); *G01J 2003/1221* (2013.01); *G01J 2003/2806* (2013.01); *G01J 2003/516* (2013.01)

(58) Field of Classification Search
  CPC ............... G01J 3/0291; G01J 2003/516; G01J 2003/1217; G01J 2003/1221; G02B 5/201; G02B 5/206
  See application file for complete search history.

(56) References Cited

U.S. PATENT DOCUMENTS

| | | | |
|---|---|---|---|
| 9,012,829 | B2 | 4/2015 | Nakamura |
| 2004/0130653 | A1 | 7/2004 | Nanjo et al. |
| 2004/0149915 | A1* | 8/2004 | Goncalves ................ G01J 3/12 250/343 |
| 2008/0266563 | A1* | 10/2008 | Redman .................... G01J 3/02 356/406 |
| 2010/0097683 | A1* | 4/2010 | Takei ..................... G02B 5/205 359/227 |
| 2011/0108721 | A1* | 5/2011 | Ford ........................ G01J 3/08 250/269.1 |
| 2014/0061486 | A1 | 3/2014 | Bao et al. |
| 2017/0038255 | A1* | 2/2017 | Smith ................... G01J 3/2803 |
| 2017/0186793 | A1* | 6/2017 | Ockenfuss ........ H01L 27/14621 |
| 2019/0049296 | A1 | 2/2019 | Cho et al. |

FOREIGN PATENT DOCUMENTS

| | | |
|---|---|---|
| KR | 10-2006-0077149 A | 7/2006 |
| KR | 10-2007-0066636 A | 6/2007 |
| WO | 02/088646 A1 | 11/2002 |

OTHER PUBLICATIONS

Bao, Jie, et. al, "A colloidal quantum dot spectrometer", Jul. 2, 2015, Nature, vol. 523, 16 pages total.

* cited by examiner

FIG. 3
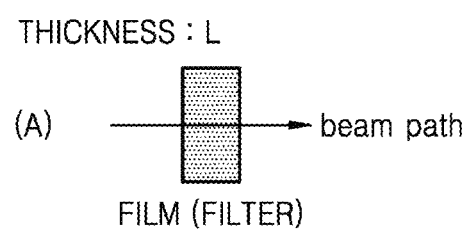
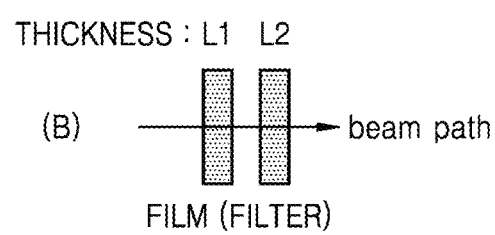

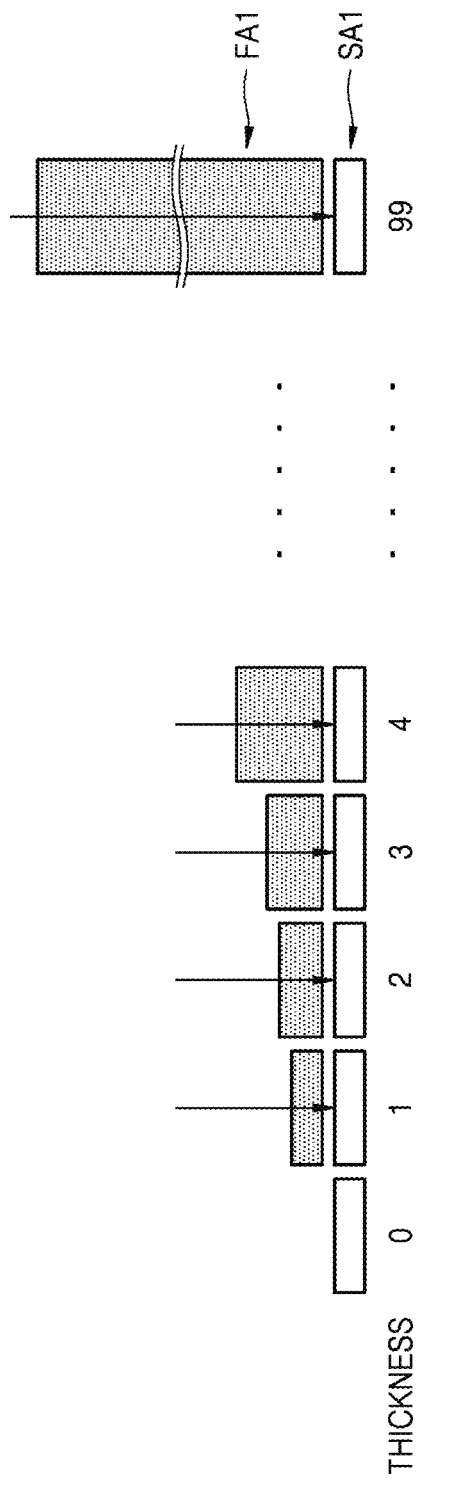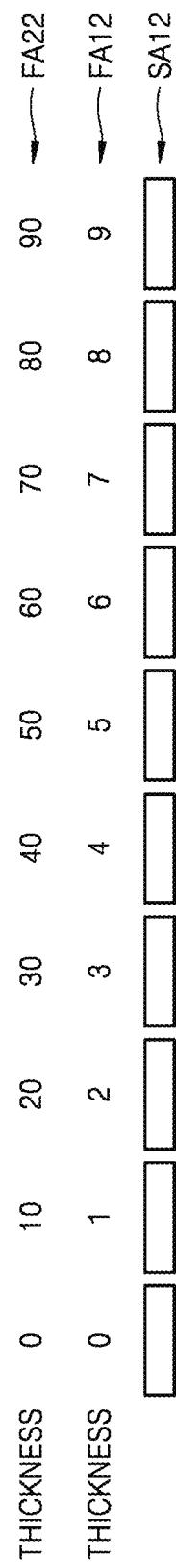

<COMPARATIVE EXAMPLE>

FIG. 9

| RATIO | 0 | 75:25 | 50:50 | 25:75 | 0:100 | ←—— FA35 |
| RATIO | 0 | 95:5 | 90:10 | 85:15 | 80:20 | ←—— FA25 |
| RATIO | 0 | 99:1 | 98:2 | 97:3 | 96:4 | ←—— FA15 |
| | ☐ | ☐ | ☐ | ☐ | ☐ | ←—— SA15 |

FIG. 11

| QD-C | 0 | 1c | 2c | 3c | 4c | ← FA37 |
| QD-B | 0 | 1b | 2b | 3b | 4b | ← FA27 |
| QD-A | 0 | 1a | 2a | 3a | 4a | ← FA17 |
|  | □ | □ | □ | □ | □ | ← SA17 |

FILTER ARRAY, SPECTRAL DETECTOR INCLUDING THE FILTER ARRAY AND SPECTROMETER EMPLOYING THE SPECTRAL DETECTOR

CROSS-REFERENCE TO RELATED APPLICATION

This application claims priority from Korean Patent Application No. 10-2017-0118834, filed on Sep. 15, 2017, in the Korean Intellectual Property Office, the disclosure of which is incorporated herein in its entirety by reference.

BACKGROUND

1. Field

Apparatuses and methods consistent with example embodiments relate to a filter array, a spectral detector including the filter array, and a spectrometer employing the spectral detector.

2. Description of the Related Art

A spectroscopy technique has been used in various fields including optics, medicine, chemistry, ocean engineering, etc. Recently, with the development and advancement of medium- and small-sized electronic/optical devices, mobile/portable devices, an Internet-of-Things (IoT) environment, etc., there is a growing need for a small-sized dispersing element and a small-sized spectrometer. A mini spectrometer is advantageous in terms of portability and applicability and is thus very useful in various fields.

In an existing spectroscopic method using a grating structure, diffracted light should be spread through a wide space to secure a resolution. Thus, the size of a spectrometer may not be reduced when this method is used. A filtering method, in which only light of a specific wavelength is transmitted and measured using an optical filter having a resonant mirror-spacer-mirror structure (e.g., a Fabry-Perot interferometer) may be employed. However, in the filtering method, a wavelength of light may be shifted according to an incidence angle of incident light and a large number of filters should be very finely and precisely manufactured. Thus, the filtering method is difficult to perform and manufacturing costs increase accordingly.

Therefore, a technique for improving the performance of an optical device such as a spectrometer while minimizing the size thereof is needed. In particular, a method/technique which is capable of improving luminous efficiency while reducing a space for spectroscopy and is advantageous in terms of a manufacturing process and a resolution is required.

SUMMARY

Provided are a filter array capable of improving luminous efficiency and photosensitivity, and a spectrometer including the same.

Provided are a filter array which is capable of reducing the number of filters to be used and is thus advantageous in terms of a manufacturing process and costs, and a spectrometer including the same.

Provided are a filter array capable of increasing the efficiency of measuring spectrums and achieving high resolution, and a spectrometer including the same.

According to an aspect of an example embodiment, a spectral detector may include a multi-arrangement type filter array including a plurality of filter arrays arranged to overlap each other in a path of propagation of incident light; and a sensor array including a plurality of sensors configured to sense light passing through the multi-arrangement type filter array. The multi-arrangement type filter array may include a first filter array having a first structure in which a plurality of first filters with different transmittance spectrums according to different absorbance characteristics thereof are arranged; and a second filter array having a second structure in which a plurality of second filters with different transmittance spectrums according to different absorbance characteristics thereof are arranged, the second filter array being arranged to overlap the first filter array at a first position relative to the first filter array so that the multi-arrangement type filter array has a first set of absorbance characteristics. The second filter array may be configurable to be arranged to at least partially overlap the first filter array at a second position relative to the first filter array so that the multi-arrangement type filter array has a second set of absorbance characteristics different from the first set of absorbance characteristics.

At least one of the first filter array and the second filter array may be configured to be movable, and a match combination between the plurality of first filters and the plurality of second filters may be changed by moving the at least one of the first filter array and the second filter array.

The spectral detector may further include at least one of: a first position moving member configured to move positions of at least some of the plurality of first filters, the first position moving member being coupled to the first filter array; and a second position moving member configured to move positions of at least some of the plurality of second filters, the second position moving member being coupled to the second filter array.

The plurality of first filters may have different thicknesses and/or have different mixing ratios between materials thereof.

The plurality of second filters may have different thicknesses and/or have different mixing ratios between materials thereof.

The plurality of first filters may include substantially the same material, and have different thicknesses.

The plurality of second filters may include substantially the same material and have different thicknesses.

A degree of change in the thicknesses of the plurality of first filters may be different from a degree of change in the thicknesses of the plurality of second filters.

A largest thickness among the thicknesses of the plurality of first filters may be different from a largest thickness among the thicknesses of the plurality of second filters.

The plurality of first filters may include a first type of quantum dots. The plurality of second filters may include a second type of quantum dots. The first type of quantum dots and the second type of quantum dots may be the same or different.

The plurality of first filters may have different mixing ratios between at least two materials thereof.

The plurality of second filters may have different mixing ratios between at least two materials thereof.

A degree of change in the mixing ratios between at least two materials of the plurality of first filters may be different from a degree of change in the mixing ratios between at least two materials of the plurality of second filters.

A largest mixing ratio among the mixing ratios between at least two materials of the plurality of first filters may be different from a largest mixing ratio among the mixing ratios between at least two materials of the plurality of second filters.

The plurality of first filters may have the same thickness.

The plurality of second filters may have the same thickness.

Two or more types of quantum dots may be mixed in different ratios in the plurality of first filters and/or the plurality of second filters.

The plurality of first filters may include the same first material and have different thicknesses. The plurality of second filters may include the same second material and have different thicknesses.

The same first material may include a first quantum dot, and the same second material may include a second quantum dot different from the first quantum dots.

At least one among the plurality of first filters and the plurality of second filters may include at least one among quantum dots, nanoparticles, an organic material, and an inorganic material. Here, the nanoparticles may be particles different from the quantum dots, and the inorganic material may be a material different from the quantum dots and the nanoparticles.

The spectral detector may further include an anti-reflection layer provided on a top surface of each of the plurality of first filters.

The plurality of filter arrays may further include a third filter array including of a plurality of third filters with different transmittance spectrums, the third filter array arranged to overlap the second filter array. The plurality of third filters may have different thicknesses and/or have different mixing ratios between materials thereof.

The plurality of filter arrays may further include at least one additional filter array arranged to overlap the third filter array.

According to an aspect of an example embodiment, a spectrometer may include the spectral detector described above.

According to an aspect of an example embodiment, a multi-arrangement type filter array may include a plurality of filter arrays arranged to overlap each other in a path of propagation of incident light. The plurality of filter arrays may include a first filter array having a first structure in which a plurality of first filters with different transmittance spectrums according to different absorbance characteristics thereof are arranged; and a second filter array having a second structure in which a plurality of second filters with different transmittance spectrums according to different absorbance characteristics thereof are arranged, the second filter array being arranged to overlap the first filter array at a first position relative to the first filter array so that the multi-arrangement type filter array has a first set of absorbance characteristics. The second filter array may be configurable to be arranged to at least partially overlap the first filter array at a second position relative to the first filter array so that the multi-arrangement type filter array has a second set of absorbance characteristics different from the first set of absorbance characteristics.

At least one of the first filter array and the second filter array may be configured to be movable, and a match combination between the plurality of first filters and the plurality of second filters may be changed by moving the at least one of the first filter array and the second filter array.

The plurality of first filters may have different thicknesses and/or have different mixing ratios between materials thereof.

The plurality of second filters may have different thicknesses and/or have different mixing ratios between materials thereof.

The plurality of first filters may include a first type of quantum dots and have different thicknesses, and the plurality of second filters may include a second type of quantum dots and have different thicknesses. The first type of quantum dots and the second type of quantum dots may be the same or different.

The plurality of first filters may have different mixing ratios between two or more types of quantum dots, and the plurality of second filters may have different mixing ratios between two or more types of quantum dots.

At least one among the plurality of first filters and the plurality of second filters may include at least one among quantum dots, nanoparticles, an organic material, and an inorganic material.

The plurality of filter arrays may further include at least one additional filter array arranged to overlap the second filter array.

Additional aspects will be set forth in part in the description which follows and, in part, will be apparent from the description, or may be learned by practice of the presented example embodiments.

BRIEF DESCRIPTION OF THE DRAWINGS

These and/or other aspects will become apparent and more readily appreciated from the following description of example embodiments, taken in conjunction with the accompanying drawings in which:

FIG. 3 is a cross-sectional view for explaining principles of optics applicable to multi-arrangement type filter arrays, according to an example embodiment;

FIG. 4 is a cross-sectional view of a spectral detector with a single filter array, according to a comparative example;

FIG. 5 is a conceptual diagram illustrating a spectral detector with a multi-arrangement type filter array, according to an example embodiment;

FIG. 9 is a conceptual diagram illustrating a spectral detector with a multi-arrangement type filter array, according to an example embodiment;

FIG. 11 is a conceptual diagram illustrating a spectral detector with a multi-arrangement type filter array, according to an example embodiment;

DETAILED DESCRIPTION

Figure 1:
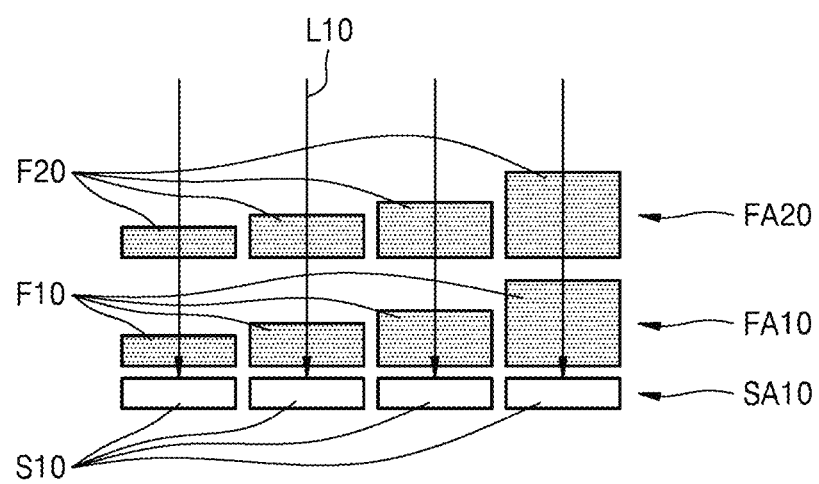
FIG. 1 is a cross-sectional view of a spectral detector with a multi-arrangement type filter array, according to an example embodiment.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first," "second," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

Hereinafter, a filter array, a spectral detector including the filter array, and a spectrometer employing the spectral detector according to example embodiments will be described in detail with reference to the accompanying drawings. In the drawings, the width and thickness of each layer or region may be exaggerated for clarity and convenience of explanation. Throughout the detailed description, the same reference numerals represent the same components.

FIG. 1 is a cross-sectional view of a spectral detector with a multi-arrangement type filter array according to an example embodiment.

Referring to FIG. 1, the multi-arrangement type filter array according to the present example embodiment may include a plurality of filter arrays arranged to overlap each other in a path of propagation of incident light L10. The plurality of filter arrays may include, for example, a first filter array FA10 and a second filter array FA20. The first filter array FA10 may include a plurality of first filters F10 having different absorbing characteristics and thus forming different transmittance spectrums. Similarly, the second filter array FA20 may include a plurality of second filters F20 having different absorbing characteristics and thus forming different transmittance spectrums. The second filter array FA20 may be arranged to at least partially overlap the first filter array FA10. In other words, the plurality of second filters F20 may be arranged to at least partially overlap the plurality of first filters F10.

The multi-arrangement type filter array may be provided on a sensor array SA10. The sensor array SA10 may include a plurality of sensors S10 for sensing light transmitted through the multi-arrangement type filter array. The sensor array SA10 may be referred to as a sensor or a light receiver for transforming light transmitted through the multi-arrangement type filter array into an electrical signal. The first filter array FA10 may be located between the sensor array SA10 and the second filter array FA20. In other words, the first filter array FA10 and the second filter array FA20 may be sequentially located on the sensor array SA10. Thus, the multi-arrangement type filter array may be also referred to as a stack type filter array or a multi-stack type filter array.

The multi-arrangement type filter array may be configured such that an arrangement of the plurality of first filters F10 relative to the plurality of second filters F20 is variable. A match combination between the plurality of first filters F10 and the plurality of second filters F20 is variable. In other words, positions or orientations of either or both of the plurality of first filters F10 and the plurality of second filters F20 may be physically adjusted (e.g., by rotational and/or rectilinear movement) so that each filter of the plurality of filters F10 may be aligned or combined with any of the plurality of second filters F20. At least one of the first filter array FA10 and the second filter array FA20 may be configured to be movable. The relative arrangements may be changed by moving at least one of the first filter array FA10 and the second filter array FA20. At least one of the first filter array FA10 and the second filter array FA20 may be configured to make a rotary motion or a rectilinear motion, as will be described in detail with reference to FIGS. 14 to 19 below.

The plurality of first filters F10 may have different thicknesses and/or have different mixing ratios of materials (constituting materials) thereof. FIG. 1 illustrates a case in which the plurality of first filters F10 have different thicknesses. Absorbance spectrums of the plurality of first filters F10 may be different due to the different thicknesses thereof and different transmittance spectrums may be thus formed. Similarly, the plurality of second filters F20 may have different thicknesses and/or have different mixing ratios of materials (constituting materials) thereof. FIG. 1 illustrates a case in which the plurality of second filters F20 have different thicknesses. Absorbance spectrums of the plurality of second filters F20 may be different due to the different thicknesses thereof and different transmittance spectrums may be thus formed. For example, the plurality of first filters F10 may include substantially the same materials and have different thicknesses. Similarly, the plurality of second filters F20 may include substantially the same materials and have different thicknesses. In this case, the material of the plurality of first filters F10 and the material of the plurality of second filters F20 may be the same or different.

The sensors S10 of the sensor array SA10 may include, for example, charge-coupled devices (CCDs), image sensors such as complementary metal-oxide-semiconductor (CMOS) image sensors, photodiodes, or the like but are not limited thereto. A spectrum input to a device may be reconstructed using transmittance spectrums of the plurality of filter arrays FA10 and FA20 and signals of the sensor array SA10.

Figure 2:
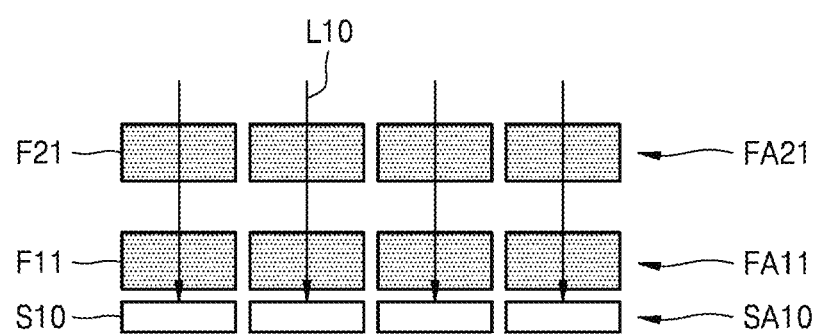
FIG. 2 is a cross-sectional view of a spectral detector with a multi-arrangement type filter array, according to an example embodiment.

FIG. 2 is a cross-sectional view of a spectral detector with a multi-arrangement type filter array according to an example embodiment.

Referring to FIG. 2, a first filter array FA11 may include a plurality of first filters F11. The plurality of first filters F11 may have substantially the same thickness (e.g., uniform thickness). A second filter array FA21 may include a plurality of second filters F21. The plurality of second filters F21 may have substantially the same thickness. Thicknesses of the plurality of first filters F11 and thicknesses of the plurality of second filters F21 may be the same or different.

The plurality of first filters F11 may have different mixing ratios of at least two materials thereof. Due to the different mixing ratios, the plurality of first filters F11 may have different absorbing characteristics and may thus form different transmittance spectrums. Similarly, The plurality of second filters F21 may have different mixing ratios of at least two materials thereof and may form different transmittance spectrums due to the different mixing ratios.

The spectral detector according to the present example embodiment may be configured such that an arrangement the plurality of first filters F11 relative to the plurality of second filters F21 is variable.

FIG. 3 is a cross-sectional view for explaining principles of optics applicable to multi-arrangement type filter arrays according to an example embodiment.

Referring to FIG. 3, if light (beam) passes through a film (medium/filter) formed of the same substance, a degree of absorption and an absorbance spectrum of the light may be the same when a path of propagation of the light (beam) within the film (medium) and a length (thickness) of the path are the same regardless of whether the light (beam) passes through the film (medium) all at the same time (see (A) of FIG. 3) or sequentially passes through parts of the film (medium) (see (B) of FIG. 3). Since a filter may be manufactured in a stack structure (a multi-structure) by dividing the filter into two or more parts according to this principle, a multi-stack type filter array, i.e., a multi-arrangement type filter array, may be obtained.

In an optical filter based on an absorbance spectrum, as a thickness of a film increases according to the Beer-Lambert law, an optical density of the absorbance spectrum may increase. The increase in the optical density of the absorbance spectrum is involved with a total thickness of the filter in a light path. Even if the filter having the same thickness is divided into parts, a degree of absorption of the beam and an absorbance spectrum are the same as long as a length of a path in which a beam passes through the filter is the same.

The Beer-Lambert law may be expressed by Equation 1 below.

$$A(\text{absorbance}) = \log_{10}(I_O/I) = eLc,\qquad \text{[Equation 1]}$$

where A represents an absorbance, $I_O$ represents the intensity of incident light, I represents the intensity of transmitted light, e represents an absorption coefficient, c represents a material variable (density or concentration) of a medium, and L represents a length (thickness) of light passing through a medium.

In (A) of FIG. 3, an absorbance A may be e·L·c. In (B) of FIG. 3, an absorbance A' may be e·L1·c+e·L2·c=e·(L1+L2)·c. Thus, when the same medium is used and L=L1+L2, then A'=A. Accordingly, when a length (thickness) of light passing within the medium is the same, a degree of absorption and absorbance spectrum of the light may be the same.

FIG. 4 is a cross-sectional view of a spectral detector with a single filter array, according to a comparative example.

FIG. 4 illustrates a single-layer filter array FA1. The single-layer filter array FA1 may include 100 filters having thicknesses ranging from 0 to 99. The filters may be, for example, films with quantum dots and the 100 filters may be manufactured by adjusting thicknesses of the films to be in a thickness range of 0 to 99. A region having a thickness of 0 may be a region for measuring a reference value. For convenience of explanation, the region having the thickness of 0 is counted as a filter. By using the 100 filters, 100 different spectrums may be obtained. A sensor array SA1 is arranged below the filter array FA1. The sensor array SA1 includes 100 sensors.

When the single-layer filter array FA1 as described above is used, the number of photons of incident light received at each pixel is 1/N of the number of photons in the entire area of the spectral detector, where N is the number of filters. Basically, a large number of photons are lost since light is divided and incident on a large number of filters. When a small number of photons are to be sensed by each of the filters (channels), a photosensitivity measured may be low.

FIG. 5 is a conceptual diagram illustrating a spectral detector with a multi-arrangement type filter array according to an example embodiment.

Referring to FIG. 5, a first filter array FA12 and a second filter array FA22 may be sequentially arranged on a sensor array SA12 including a plurality of sensors. In FIG. 5, for convenience of explanation, first filters of the first filter array FA12 are illustrated as numbers corresponding to thicknesses thereof, and second filters of the second filter array FA22 are illustrated as numbers corresponding to thicknesses thereof. The first filter array FA12 may include ten first filters of which thicknesses increase by 1 from 0 to 9. The second filter array FA22 may include ten second filters of which thicknesses increase by 10 from 0 to 90. Thus, a degree of change in the thicknesses of the first filters may be different from that in the thicknesses of the second filters, and a largest thickness among the thicknesses of the first filters may be different from that among the thicknesses of the second filters. The first filters of the first filter array FA12 and the second filters of the second filter array FA22 may be arranged to overlap each other. In this case, the sensor array SA12 may include ten sensors. Furthermore, an arrangement of the first filters relative to the second filters is variable.

When a multi-arrangement type filter array (including the first filter array FA12 and the second filter array FA22) is used as described above, combinations of thicknesses of 0 to 99 may be obtained from combinations of only ten sensors and twenty filters. In this case, the number of filters needed to obtain 100 spectrums is 20 which is ⅕ of 100 in FIG. 4. The number of photons received at each pixel is 1/10 of the number of photons in the entire area of the spectral detector, which is ten times greater than 1/100 of the number of photons in the entire area of the spectral detector in FIG. 4. If the number of filters arranged on a plane decreases, the number of photons received at each unit pixel increases when a size of the entire sensing region is the same. Additionally, when the number of filters needed decreases, a manufacturing process becomes simpler and the size of each unit pixel increases at the same spectrum resolution. Accordingly, a size of a spectrometer may decrease or a spatial resolution may increase.

Figure 6:
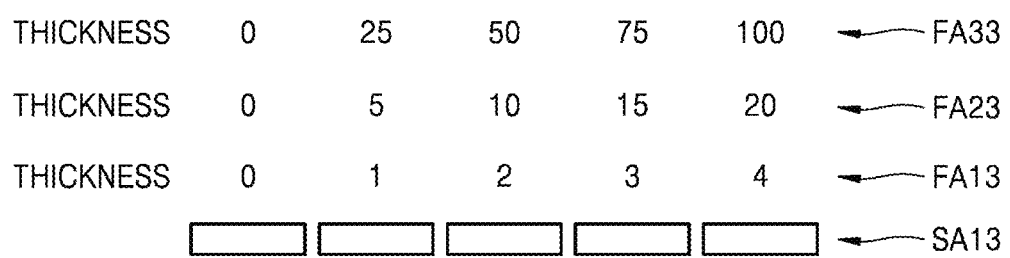
FIG. 6 is a conceptual diagram illustrating a spectral detector with a multi-arrangement type filter array, according to an example embodiment.

FIG. 6 is a conceptual diagram illustrating a spectral detector with a multi-arrangement type filter array, according to an example embodiment.

Referring to FIG. 6, a three-layer multi-arrangement type (stack type) filter array is provided. For example, a sensor array SA13 may include five sensors, and first to third filter arrays FA13, FA23, and FA33 may be arranged on the sensor array SA13. The first filter array FA13 may include five first filters of which thicknesses increase by 1 from 0 to 4. The second filter array FA23 may include five second filters of which thicknesses increase by 5 from 0 to 20. The third filter array FA33 may include five third filters of which thicknesses increase by 25 from 0 to 100. Relative arrangements among the first filters, the second filters, and the third filters may be variable.

In this case, 125 combinations of thicknesses may be obtained only using five sensors and fifteen filters. Furthermore, the number of photons received at each pixel is ⅕ of the number of total photons, which is 20 times the number of photons received at each pixel in FIG. 4. Accordingly, the number of photons which may be received at each pixel dramatically increases and a large number of combinations of spectrums may be obtained from a small number of filters.

In FIGS. 5 and 6, the first filters of the first filter arrays FA12 and FA13 may include substantially the same material and may have different thicknesses (e.g., non-uniform or variable thicknesses). The second filters of the second filter arrays FA22 and FA23 may include substantially the same material and may have different thicknesses. The third filters of the third filter array FA33 may include substantially the same material and may have different thicknesses. The materials of the first filter arrays FA12 and FA13, the materials of the second filter arrays FA22 and FA23, and the materials of the third filter array FA33 may be the same or different. For example, the first filters may be a quantum dots-based film which contains one type of quantum dots, the second filters may be a quantum dots-based film which contains one type of quantum dots, and the third filters may be a quantum dots-based film which contains one type of quantum dots, but embodiments are not limited thereto and materials of the first to third filters may be changed. At least one among the first to third filters may contain quantum dots, nanoparticles, an organic material, and/or an inorganic material.

Figure 7:
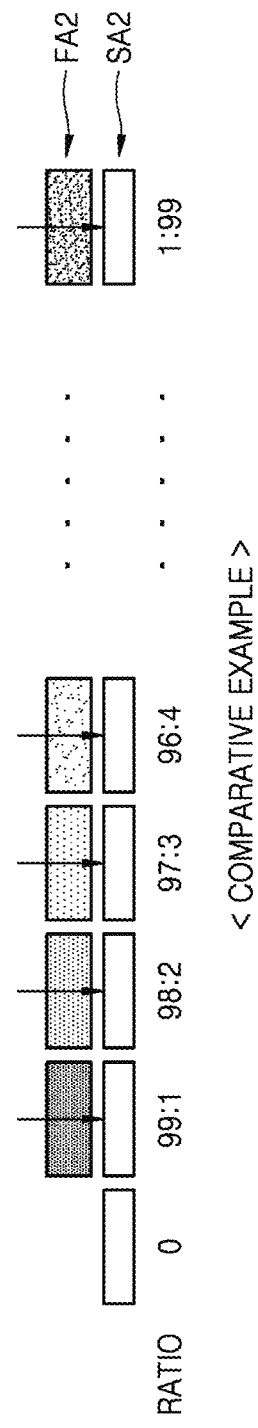
FIG. 7 is a cross-sectional view of a spectral detector with a single filter array, according to another comparative example.

FIG. 7 is a cross-sectional view of a spectral detector with a single filter array, according to another comparative example.

FIG. 7 illustrates a single-layer filter array FA2. The single-layer filter array FA2 may include a plurality of filters, in which mixing ratios between at least two materials thereof are different. For example, the plurality of filters may be films, in which a mixing ratio between first quantum dots and second quantum dots changes from 99:1 to 1:99. When a mixing ratio between first quantum dots and second quantum dots of a film is 0, it may be understood that the mixing ratio is 0:0 and the film is a region for measuring a reference value similar to when a thickness of a filter is 0. Thus, for convenience of explanation, this film is counted as one filter. 100 different spectrums may be obtained using a total of 100 filters. A sensor array SA2 is arranged below the filter array FA2. The sensor array SA2 includes 100 sensors.

Figure 8:
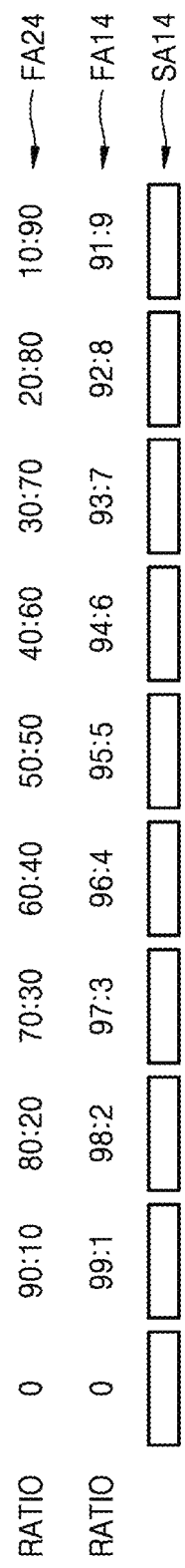
FIG. 8 is a conceptual diagram illustrating a spectral detector with a multi-arrangement type filter array, according to an example embodiment.

FIG. 8 is a conceptual diagram illustrating a spectral detector with a multi-arrangement type filter array according to an example embodiment.

Referring to FIG. 8, a first filter array FA14 and a second filter array FA24 may be sequentially arranged on a sensor array SA14 including a plurality of sensors. In FIG. 8, for convenience of explanation, first filters of the first filter array FA14 are illustrated as having mixing ratios corresponding thereto, and second filters of the second filter array FA24 are illustrated as having mixing ratios corresponding thereto. The first filter array FA14 may include ten first filters, in which a mixing ratio between two materials thereof changes by 1 from 99:1 to 91:9. The second filter array FA24 may include ten second filters, in which a mixing ratio between two materials thereof changes by 10 from 90:10 to 10:90. Thus, a degree of change in the mixing ratios of the first filters may be different from that in the mixing ratios of the second filters, and a largest mixing ratio among the mixing ratios of the first filters may be different that among the mixing ratios of the second filters. The sensor array SA14 may include ten sensors. An arrangement of the first filters relative to the second filters may be variable.

In this case, 100 combinations of mixing ratios may be obtained from combinations of ten sensors and twenty filters. The number of filters needed to obtain 100 spectrums is ⅕ of that in FIG. 4, and the number of photons received at each pixel is ten times that in FIG. 4.

FIG. 9 is a conceptual diagram illustrating a spectral detector with a multi-arrangement type filter array according to an example embodiment.

Referring to FIG. 9, a three-layer multi-arrangement type (stack type) filter array is provided. For example, a sensor array SA15 may include five sensors and first to third filter arrays FA15, FA25, and FA35 may be arranged thereon. The first filter array FA15 may include five first filters of which mixing ratios are changed by 1. The second filter array FA25 may include five second filters of which mixing ratios are changed by 5. The third filter array FA35 may include five third filters of which mixing ratios are changed by 25. In this case, 125 combinations of mixing ratios may be obtained using only five sensors and fifteen filters. Furthermore, the number of photons received at each pixel may be twenty times that in FIG. 4.

In FIGS. 8 and 9, the first filters of the first filter arrays FA14 and FA15 may have different mixing ratios between at least two materials thereof but may have substantially the same thickness. The second filters of the second filter arrays FA24 and FA25 may have different mixing ratios between at least two materials thereof but may have substantially the same thickness. The third filters of the third filter array FA35 may have different mixing ratios between at least two materials thereof but may have substantially the same thickness. For example, the first filters may have different mixing ratios between two types of quantum dots thereof, the second filters may have different mixing ratios between two types of quantum dots thereof, and the third filters may have different mixing ratios between two types of quantum dots thereof, but embodiments are not limited thereto and materials of the first to third filters may be changed. At least one of the first to third filters may be formed of at least one among quantum dots, nanoparticles, an organic material, and an inorganic material.

Figure 10:
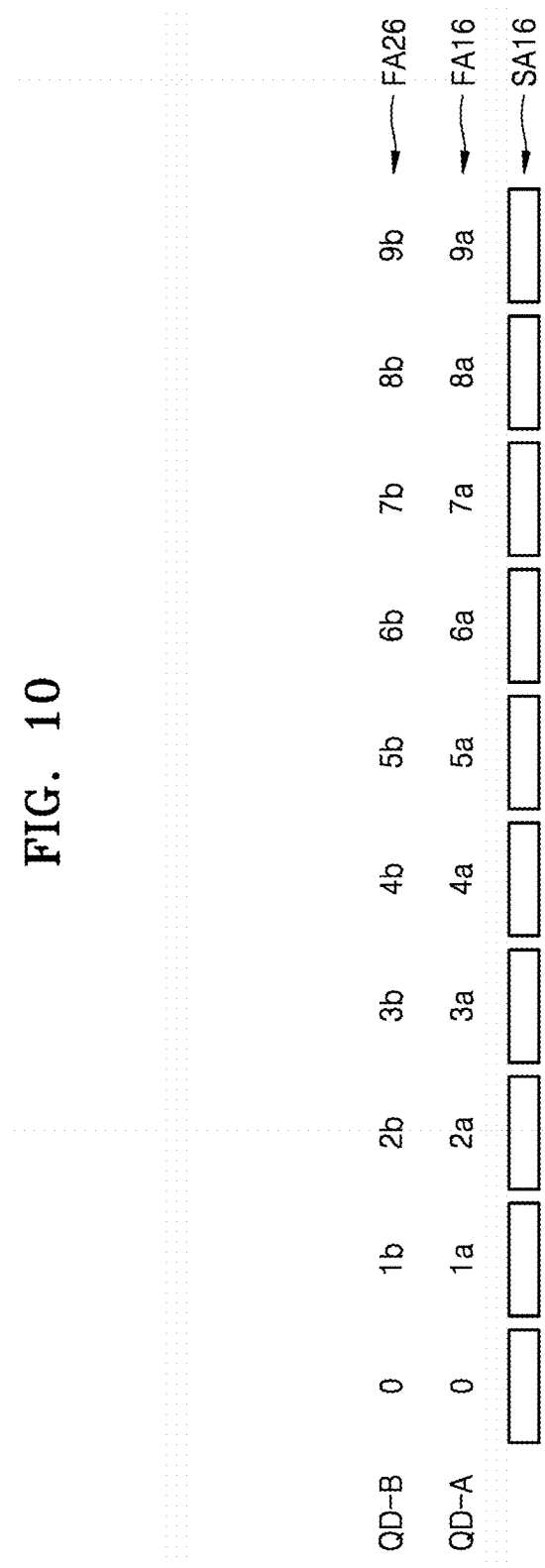
FIG. 10 is a conceptual diagram illustrating a spectral detector with a multi-arrangement type filter array, according to an example embodiment.

FIG. 10 is a conceptual diagram illustrating a spectral detector with a multi-arrangement type filter array according to an example embodiment.

Referring to FIG. 10, a first filter array FA16 may include a plurality of first filters with first quantum dots QD-A, and the plurality of first filters may have different thicknesses. The thicknesses of the first filters may be 0, 1a, . . . , 9a. The second filter array FA26 may include a plurality of second filters with second quantum dots QD-B. The plurality of second filters may have different thicknesses. The thicknesses of the second filters may be 0, 1b, . . . , 9b. The type of the second quantum dots QD-B may be different from that of the first quantum dots QD-A. For example, the second quantum dots QD-B may be different from the first quantum dots QD-A in terms of at least one of a size and a material thereof. The number of the first filters and the number of the second filters may be ten each. A sensor array SA16 may include ten sensors. In this case, 100 spectrums may be obtained from combinations of ten sensors and twenty filters.

FIG. 11 is a conceptual diagram illustrating a spectral detector with a multi-arrangement type filter array according to an example embodiment.

Referring to FIG. 11, a first filter array FA17 may include a plurality of first filters with first quantum dots QD-A, and thicknesses of the first filters may be 0, 1a, . . . , 4a. A second filter array FA27 may include a plurality of second filters with second quantum dots QD-B, and thicknesses of the second filters may be 0, 1b, . . . , 4b. The third filter array FA37 may include a plurality of third filters with third quantum dots QD-C, and thicknesses of the third filters may be 0, 1c, . . . , 4c. The number of the first filters, the number of second filters, and the number of third filters may be five each. A sensor array SA17 may include five sensors. In this case, 125 spectrums may be obtained from combinations of five sensors and fifteen filters.

Although examples of a multi-array structure, e.g., a two-layer or three-layer structure, have been described above with reference to FIGS. 5, 6, and 8 to 11, the number of layers of a multi-array structure may be three or more. Thus, one or more additional filter arrays may be further provided on a third filter array. Each of the one or more additional filter arrays may include a plurality of filters with different transmittance spectrums. A multi-arrangement type filter array may include about two-layer to ten- or fifteen-layer filter arrays but embodiments are not limited thereto. As the number of layers of the multi-arrangement type filter array increases, the number of sensors needed may decrease and a unit area of each sensor may increase.

When multi-arrangement type filter arrays according to example embodiments are used, the efficiency of spectrometry may be increased. For example, when a spectrometer with 1 nm resolution in a section of light of a wavelength of 800 to 900 nm is manufactured, light should be incident on all 100 filters and thus the amount of light received at each pixel is always 1/100 of a total amount of light in the case of the related art. In terms of a measurement time, when 1,000 photons are received per unit time (e.g., per second), 10 photons are received using each filter per second. When light is received to measure a spectrum for ten seconds, the number of photons received for each filter is 100 (=1000 photons/second÷100 filters×10 seconds), and thus 10,000 photons may be received using a total of 100 filters. In the case of a two-layer (stacked) structure, 10 sensors are included and thus 100 photons are received for each sensor (pixel) per second. Since ten combinations are measured ten times, the measurement is performed for a total of ten seconds and thus a time period needed for the measurement is the same as that when a spectrometer according to a comparative example (a spectrometer using 100 single-array filters) is used.

However, a spectrometer according to an example embodiment may be more useful when measurement is needed in only a section of light of a wavelength of 800 to 900 nm. For example, when measurement is needed in a section of light of a wavelength of 841 to 845 nm, light is incident on all filters and thus 10,000 photons are received when measurement is performed for ten seconds in the case of the spectrometer according to the comparative example. However, 500 photons incident on filters corresponding to a wavelength of 841 to 845 nm is the number of photons which are actually needed, and all the remaining photons (9,500 photons) incident on 95 filters are lost. In contrast, in a two-layer (stacked) structure according to an example embodiment, measurement is performed per second five times and thus it takes a total of five seconds for the measurement. In a three-layer (stacked) structure according to an example embodiment, measurement is performed for 0.5 seconds each, five times (each filter occupies ⅕ of a total area of the structure and 100 photons are incident on each filter for 0.5 seconds), and thus it takes a total of 2.5 seconds for the measurement. Accordingly, example embodiments may be considerably more efficient in terms of a measurement time.

Furthermore, as the number of pixels (filters) decreases, an area of barriers (partition walls) in a filter array region decreases and an area of a driver (driving element) in a sensor array region decreases. Thus, luminous efficiency and measurement efficiency may be more improved, as will be briefly described with reference to FIGS. 12 and 13 below.

Figure 12:
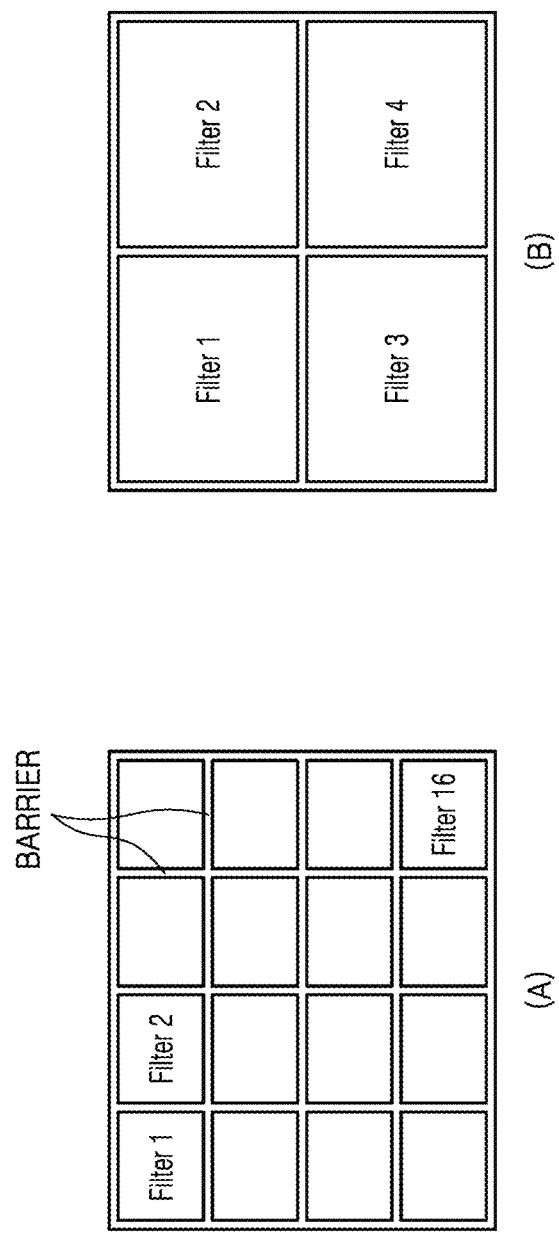
FIG. 12 is a plan view illustrating an increase in an effective region of a filter array, caused by a decrease in the number of filters and an increase in a unit size.

FIG. 12 is a plan view illustrating an increase in an effective region of a filter array, caused by a decrease in the number of filters and an increase in a unit size. Referring to FIG. 12, when the number of filters decreases and thus a unit area increases (A→B), an area of barriers in an entire region of the filter array decreases. Thus, an effective sensing area may increase and measurement efficiency may be improved.

Figure 13:
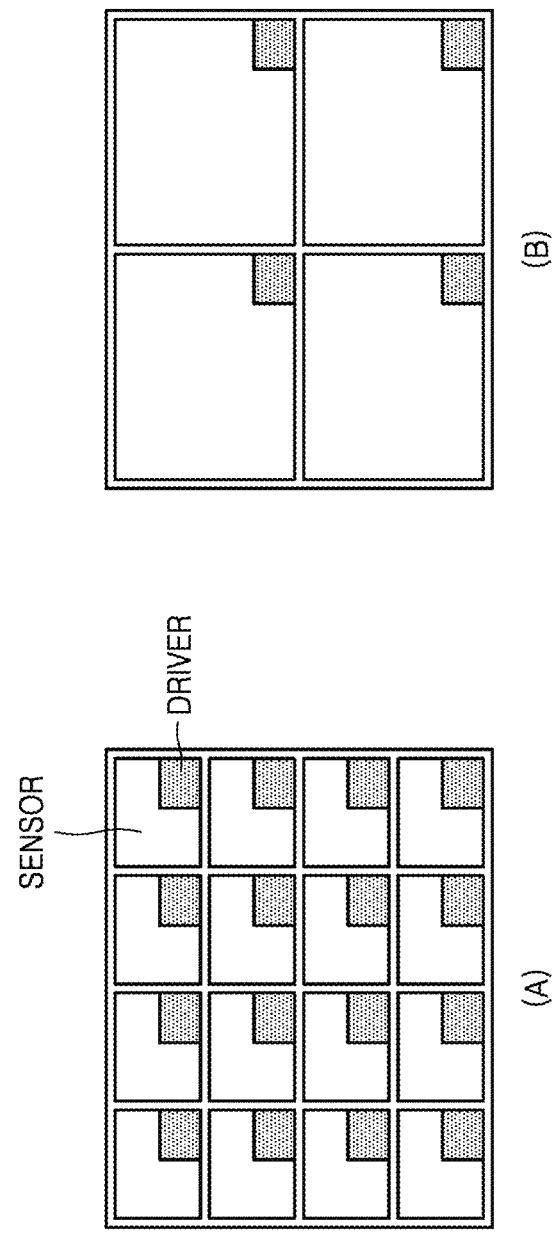
FIG. 13 is a plan view illustrating an increase in an effective region of a sensing array, caused by a decrease in the number of filters and an increase in a unit size.

FIG. 13 is a plan view illustrating an increase in an effective region of a sensing array, caused by a decrease in the number of filters and an increase in a unit size. Referring to FIG. 13, when a size of a unit pixel increases (A→B), a relative area of a driver in a sensor array decreases and an effective sensor region increases.

When a size of a unit pixel increases, a high resolution may be achieved more easily. As the size of the unit pixel decreases, an area of barriers or a relative area of a driver in a sensor increases. Thus, reducing a size of each pixel is limited. In a multi-array structure (i.e., a multi-stack structure), an area of a unit pixel may be increased and thus a device appropriate for high resolution may be implemented.

In example embodiments, at least one of a plurality of filter arrays may be configured to be movable and relative arrangements of filters may be changed by moving at least one of the plurality of filters. When the plurality of filter arrays include a first filter array and a second filter array, at least one of the first and second filter arrays may be configured to be movable. For example, at least one of the first and second filter arrays may be configured to make a rotary motion or a rectilinear motion, as will be described with reference to FIGS. 14 to 17 below.

Figure 14:
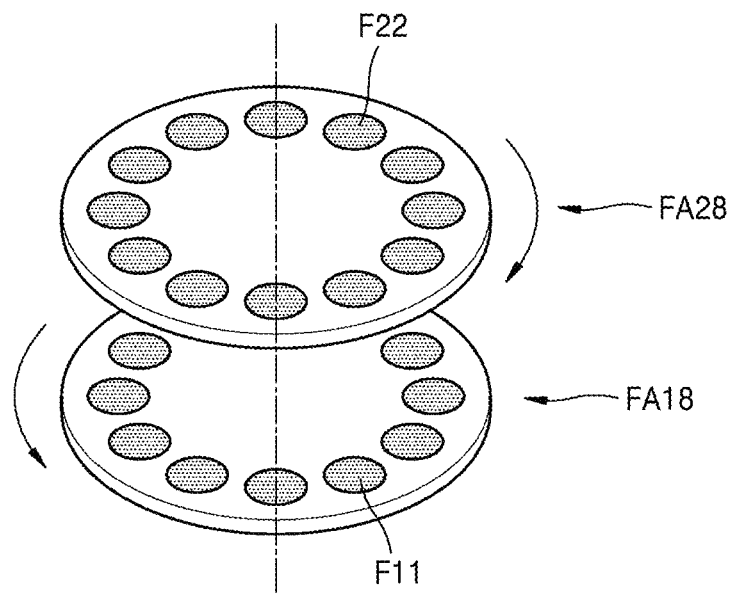
FIG. 14 is a perspective view illustrating a method of changing relative arrangements of filters of a multi-arrangement type filter array, according to an example embodiment.

FIG. 14 is a perspective view illustrating a method of changing relative arrangement of filters of a multi-arrangement type filter array, according to an example embodiment.

Referring to FIG. 14, a first filter array FA18 including a plurality of first filters F11 may be provided, and a second filter array FA28 including a plurality of second filters F22 may be provided thereon. The first and second filter arrays FA18 and FA28 may each include a round substrate. The first filters F11 may be arranged in a ring shape, and the second filters F22 may be arranged in a ring shape. At least one of the first and second filter arrays FA18 and FA28 may be configured to make a rotary motion. An arrangement of the first filters F11 relative to the second filters F22 may be changed using the rotary motion. For example, various first, second, and/or third filters described with reference to example embodiments shown in FIGS. 1-2, 4-11, and 18-29 may be arranged in a ring shape as shown in FIG. 14 such that the filters may be moved in a rotary motion one filter position at a time. For example, the four first filters F10 in the first filter array FA10, as shown in FIG. 1, may be arranged to wrap around in a circle (e.g., at every 90-degree increment in a rotational direction) on the periphery of a disc-shaped substrate. The disc-shaped substrate may then be rotated at one filter position increment (e.g., 90 degrees) such that any one of the first filters F10 in the first filter array may be combined or aligned with any one second filter F20 of the second filter array. Although FIG. 14 shows only two filter arrays being arranged to overlap each other, three or more filter arrays may be arranged on round substrates and overlap each other.

Figure 15:
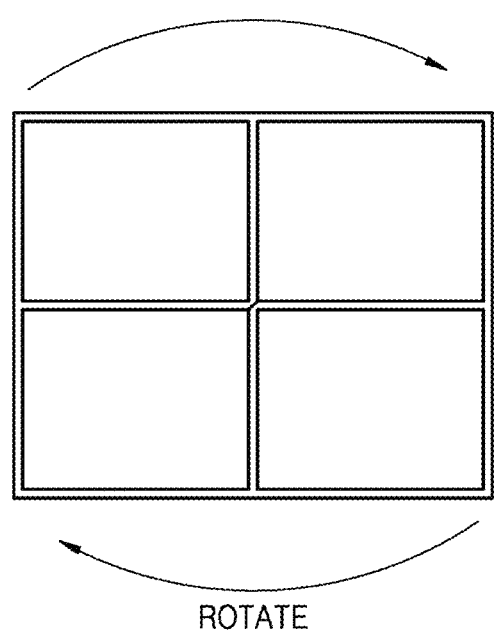
FIG. 15 is a plan view illustrating a method of moving a filter array of a multi-arrangement type filter array, according to an example embodiment.

FIG. 15 is a plan view illustrating a method of moving a filter array of a multi-arrangement type filter array, according to an example embodiment.

Referring to FIG. 15, a filter array may include a plurality of filters arranged in a rectangular (e.g., square) shape. The filter array may make a rotary motion. A second filter array corresponding to the first filter array may be provided on the first filter array, and relative arrangements of filters may be changed by moving the filter array. For example, various first, second, and/or third filters described with reference to example embodiments shown in FIGS. 1-2, 4-11, and 18-29 may each be arranged in an M×N matrix, where M and N are natural numbers. Two or more filter arrays may be arranged to overlap each other and move in a rotary and/or rectilinear motion to achieve different combinations and alignments of filters between the first and second filter arrays.

Figure 16:
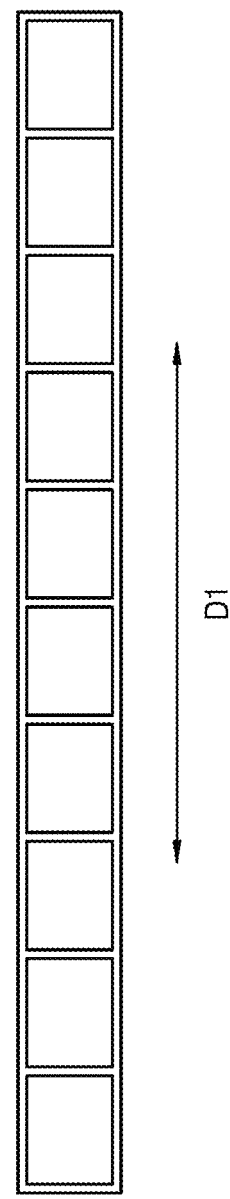
FIG. 16 is a plan view illustrating a method of moving a filter array of a multi-arrangement type filter array, according to an example embodiment.

FIG. 16 is a plan view illustrating a method of moving a filter array of a multi-arrangement type filter array, according to an example embodiment.

Referring to FIG. 16, a filter array may have a structure in which a plurality of filters are arranged in a line. The filter array may make a rectilinear motion (reciprocating motion) in a first direction D1 parallel to a direction in which the filters are arranged. A second filter array corresponding to the filter array may be provided on the filter array. Relative arrangements of the filters may be changed by moving the filter array.

Figure 17:
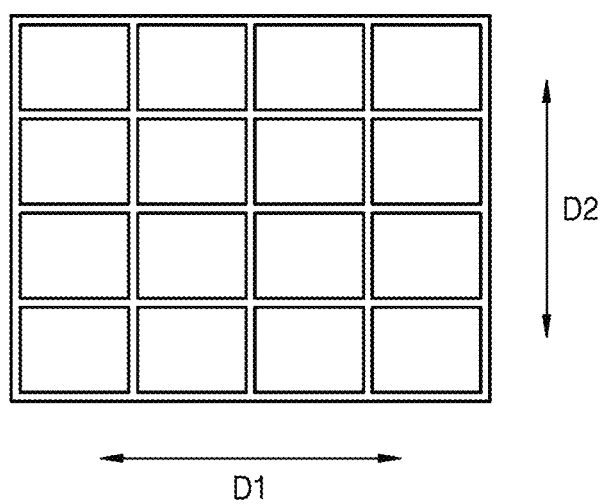
FIG. 17 is a plan view illustrating a method of moving a filter array of a multi-arrangement type filter array, according to an example embodiment.

FIG. 17 is a plan view illustrating a method of moving a filter array of a multi-arrangement type filter array, according to an example embodiment.

Referring to FIG. 17, a filter array may have a structure, in which a plurality of filters are arranged in a plurality of rows and a plurality of rows. The filter array may make a rectilinear motion (reciprocating motion) in a first direction D1 and a second direction D2 perpendicular to the first direction D1. Thus, the filters may be moved on a two-dimensional (2D) plane. A second filter array corresponding to the filter array may be provided on the filter array, and relative arrangements of the filters may be changed by moving the filter array.

Figure 18:
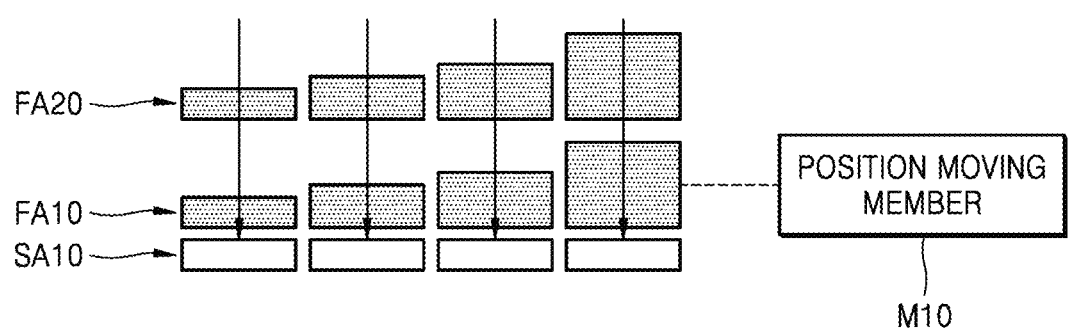
FIG. 18 is a cross-sectional view of a spectral detector with a multi-arrangement type filter array according to an example embodiment.

FIG. 18 is a cross-sectional view of a spectral detector with a multi-arrangement type filter array according to an example embodiment.

Referring to FIG. 18, a position moving member M10 may be coupled to one of a first filter array FA10 and a second filter array FA20, e.g., the first filter array FA10. The position moving member M10 may change positions of at least some of a plurality of first filters of the first filter array FA10. Through the position moving member M10, the first filter array FA10 may make a rotary motion or a rectilinear motion. In this case, a position of the second filter array FA20 may be fixed.

Figure 19:
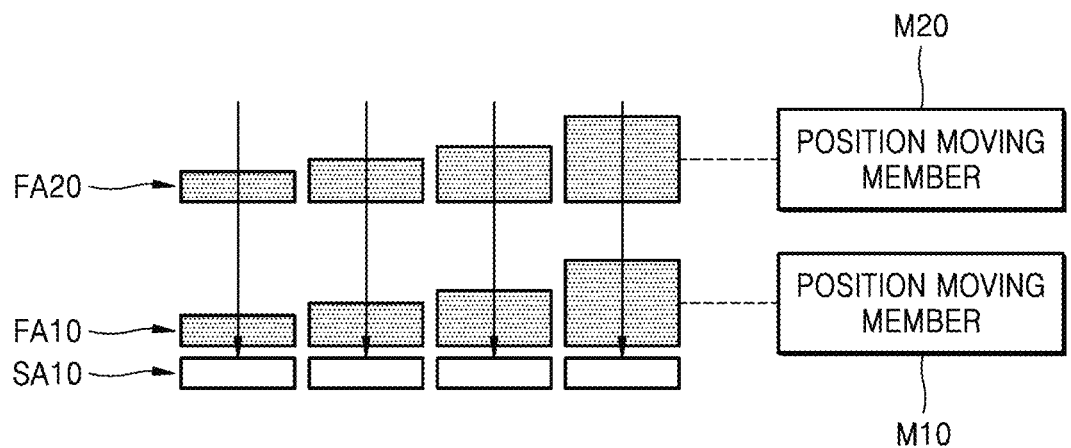
FIG. 19 is a cross-sectional view of a spectral detector with a multi-arrangement type filter array, according to an example embodiment.

FIG. 19 is a cross-sectional view of a spectral detector with a multi-arrangement type filter array according to an example embodiment.

Referring to FIG. 19, a first position moving member M10 may be coupled to a first filter array FA10, and a second position moving member M20 may be coupled to second filter array FA20. The first position moving member M10 may change positions of at least some of filters of the first filter array FA10. The second position moving member M20 may change positions of at least some of filters of the second filter array FA20. Each of the first position moving member M10 and the second position moving member M20 may be implemented with, for example, an electric motor. The electric motor may be any device that is capable of converting electric energy into kinetic energy, thereby causing one or more filter arrays to move in a rotary and/or rectilinear motion.

Figure 20:
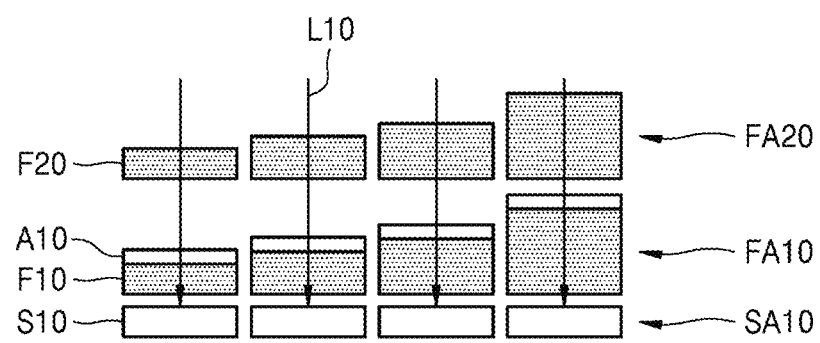
FIG. 20 is a cross-sectional view of a spectral detector with a multi-arrangement type filter array, according to an example embodiment.

FIG. 20 is a cross-sectional view of a spectral detector with a multi-arrangement type filter array according to an example embodiment.

Referring to FIG. 20, a spectral detector having a structure similar to that of the spectral detector of FIG. 1 may be provided. An anti-reflection layer A10 may be further provided on a top surface of each of a plurality of first filters F10, when compared to the spectral detector of FIG. 1. The anti-reflection layer A10 may prevent light from being reflected from the top surface of each of the first filters F10. The anti-reflection layer A10 may be formed of various types of anti-reflection materials employed in an optical device.

Examples of a composition of materials of filter arrays of a multi-arrangement type filter array according to example embodiments will be described with reference to FIGS. 21 to 29 below. FIGS. 21 to 29 illustrate only three filters of one filter array as examples.

Figure 21:
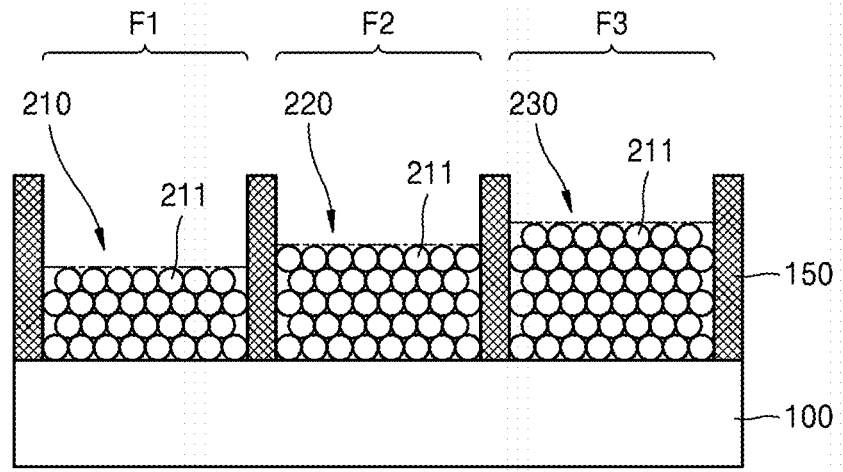
FIGS. 21 to 29 are cross-sectional views illustrating examples of a composition of materials of a filter array of a multi-arrangement type filter array, according to an example embodiment.

FIG. 21 is a cross-sectional view illustrating a composition of materials of a filter array of a multi-arrangement type filter array, according to an example embodiment.

Referring to FIG. 21, a first filter F1, a second filter F2, and a third filter F3 may respectively include a first spectrum modulation layer 210, a second spectrum modulation layer 220, and a third spectrum modulation layer 230. Here, the term "spectrum modulation layer" should be understood to mean a layer controlling a transmittance spectrum by using (or on the basis of) absorbance characteristics. Thus, the term "spectrum modulation layer" may be referred to as a "spectrum determination layer" or a "spectrum control layer" based on absorbance characteristics. Here, the first, second, and third spectrum modulation layers 210, 220, and 230 may include quantum dots (QDs) 211. The quantum dots 211 may be, for example, colloidal quantum dots. Generally, the quantum dots 211 refer to semiconductor particles each having a size of several nanometers. The quantum dots 211 may include, for example, CdSe, CdS, PbSe, PbS, InAs, InP, CdSeS, or the like but are not limited thereto and may include other various types of semiconductor materials. The first, second, and third spectrum modulation layers 210, 220, and 230 may be provided on a substrate 100. A plurality of barriers 150 may be provided on the substrate 100. The spectrum modulation layers 210, 220, and 230 may be provided in spaces defined by the plurality of barriers 150.

The first, second and third spectrum modulation layers 210, 220, and 230 may include one type of quantum dots 211. Here, the one type of quantum dots 211 refer to quantum dots having the same size and containing the same material. As an example, CdSe particles having a diameter of about 5 nm may be used as the one type of quantum dots 211 but embodiments are not limited thereto. The first, second, and third spectrum modulation layers 210, 220, and 230 may have different thicknesses. As an example, the first, second, and third spectrum modulation layers 210, 220, and 230 may include CdSe particles having a diameter of 5 nm and have respective thicknesses of 10 nm, 40 nm, and 70 nm. However, embodiments are not limited thereto. The spectrum modulation layers 210, 220, and 230 may each have, for example, a thickness ranging from about 10 nm to 100 μm but are not limited thereto.

In the present example embodiment, the first to third filters F1, F2, and F3 are formed by changing thicknesses of the spectrum modulation layers 210, 220, and 230 including the one type of quantum dots 211, thereby forming transmittance spectrums which gradually change. An actually input spectrum may be highly precisely measured by calculating a reconstructed input spectrum by using transmittance spectrums of the filters F1, F2, and F3. The filters F1, F2, and F3 with different transmittance spectrums may be formed by differently setting thicknesses of the spectrum modulation layers 210, 220, and 230 containing the one type of quantum dots 211. Thus, when, for example, 100 different transmittance spectrums which are within a range of a wavelength of 100 nm are formed as described above, a spectrometer with a high resolution of about 1 nm or less may be realized.

Generally, in a spectrometer with quantum dots, a method of controlling a resolution by adjusting a size of quantum dots is used. However, there is a limit to achieving a high resolution of 1 nm or less by adjusting the size of the quantum dots. In contrast, as in the present example embodiment, a high resolution of 1 nm or less may be achieved by forming the spectrum modulation layers 210, 220, and 230 with the one type of quantum dots 211 to different thicknesses. Furthermore, since the thicknesses of the spectrum modulation layers 210, 220, and 230 may be adjusted relatively easily, a spectrometer with high resolution may be more easily manufactured than a spectrometer in which a size of quantum dots is adjusted through a synthesis method. For example, the spectrum modulation layers 210, 220, and 230 may be easily formed according to an inkjet method using a solution process.

Figure 22:
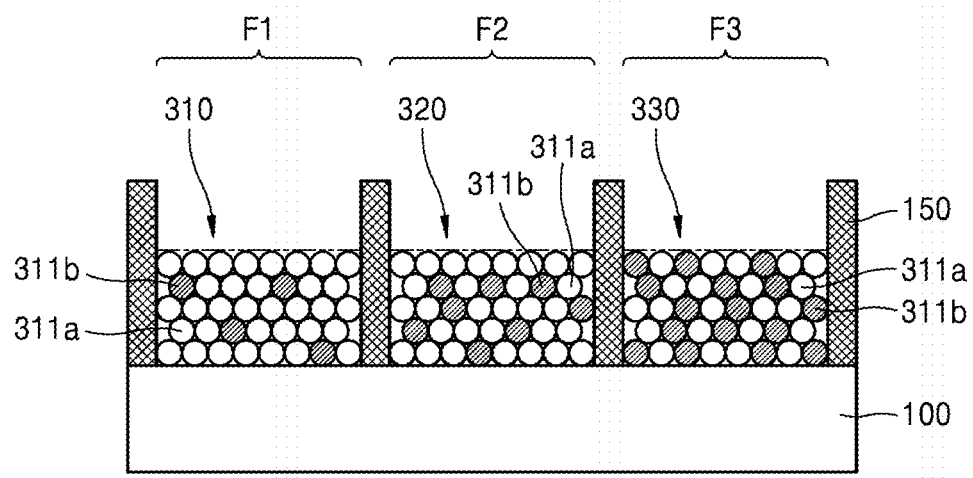

FIG. 22 is a cross-sectional view illustrating a composition of materials of a filter array of a multi-arrangement type filter array, according to an example embodiment.

Referring to FIG. 22, the filter array includes a plurality of filters F1, F2, and F3 arranged in an array. The first, second and third filters F1, F2, and F3 respectively include first, second, and third spectrum modulation layers 310, 320, and 330. The first, second, and third spectrum modulation layers 310, 320, and 330 may have substantially the same thickness. For example, the first, second, and third spectrum modulation layers 310, 320, and 330 may have a thickness ranging from about 10 nm to 100 μm but are not limited thereto.

The first, second, and third spectrum modulation layers 310, 320, and 330 may each include two types of quantum dots 311a and 311b, i.e., first and second quantum dots 311a and 311b. Here, the two types of quantum dots 311a and 311b are different in terms of at least one of a size and a material thereof. For example, the two types of quantum dots 311a and 311b having different sizes or having different materials may be provided. Alternatively, the two types of quantum dots 311a and 311b may be different in terms of both a size and a material thereof. As an example, the two types of quantum dots 311a and 311b may include the first quantum dots 311a formed of CdSe particles having a diameter of 4 nm and the second quantum dots 311b formed of CdSe particles having a diameter of 5 nm. Alternatively, the two types of quantum dots 311a and 311b may include the first quantum dots 311a formed of CdSe particles having a diameter of 4 nm and the second quantum dots 311b formed of CdS particles having a diameter of 4 nm. Alternatively, the two types of quantum dots 311a and 311b may include the first quantum dots 311a formed of CdSe particles having a diameter of 4 nm and the second quantum dots 311b formed of CdS particles having a diameter of 5 nm.

The first, second, and third spectrum modulation layers 310, 320, and 330 may have different quantum-dot mixing ratios. That is, mixing ratios between the first and second quantum dots 311a and 311b of the first, second, and third spectrum modulation layers 310, 320, and 330 may be different. As an example, a mixing ratio between the first and second quantum dots 311a and 311b of the first spectrum modulation layer 310 may be 0.01:0.99, a mixing ratio between the first and second quantum dots 311a and 311b of the second spectrum modulation layer 320 may be 0.02:0.98, and a mixing ratio between the first and second quantum dots 311a and 311b of the third spectrum modulation layer 330 may be 0.03:0.97. However, these mixing ratios are merely examples and embodiments are not limited thereto.

As described above, the spectrum modulation layers 310, 320, and 330 may be formed by differently setting a mixing ratio between the two types of quantum dots 311a and 311b, i.e., the first and second quantum dots 311a and 311b, and thus the filters F1, F2, and F3 with gradually changing transmittance spectrums may be formed. Thus, when 100 or more different transmittance spectrums which are within a range of a wavelength of 100 nm are formed as described above, a spectrometer with high resolution of about 1 nm or less may be realized. Furthermore, the quantum-dot mixing ratios of the spectrum modulation layers 310, 320, and 330 may be controlled relatively easily and thus a spectrometer with high resolution may be more easily manufactured than when a size of quantum dots are controlled through a synthesis method. The spectrum modulation layers 310, 320, and 330 may be easily formed according to the inkjet method using the solution process. Spectrum modulation layers having different mixing ratios may be easily formed by controlling the amount of a solution to be injected into each filter region using two cartridges.

A case in which the spectrum modulation layers 310, 320, and 330 each having two types of quantum dots 311a and 311b has been described above as an example, the case is merely an example and each of the spectrum modulation layers 310, 320, and 330 may include three or more types of quantum dots.

Figure 23:
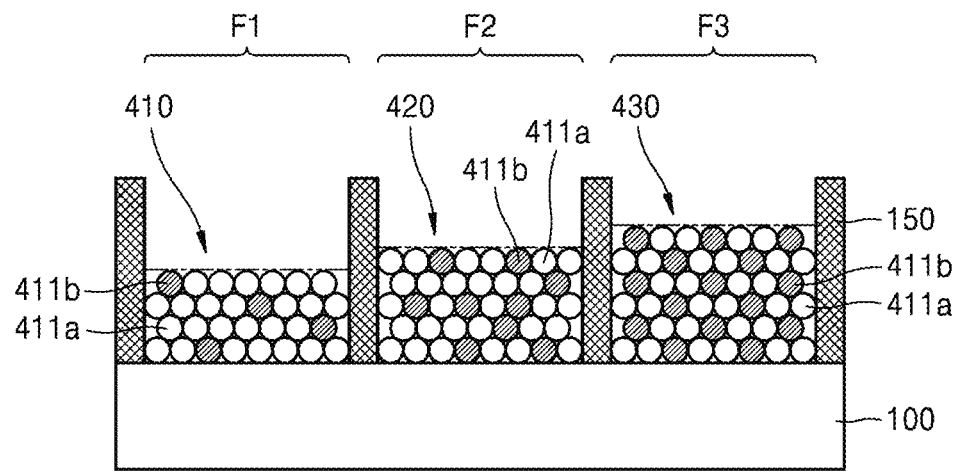

FIG. 23 is a cross-sectional view illustrating a composition of materials of a filter array of a multi-arrangement type filter array, according to an example embodiment.

Referring to FIG. 23, a filter array includes a plurality of filters F1, F2, and F3 arranged in an array. The first, second, and third filters F1, F2, and F3 respectively include first, second, and third spectrum modulation layers 410, 420, and 430. The first, second, and third spectrum modulation layers 410, 420, and 430 may have different quantum-dot mixing ratios, and may also have different thicknesses. More specifically, the first, second and third spectrum modulation layers 410, 420, and 430 may each include two types of quantum dots 411a and 411b, i.e., first and second quantum dots 411a and 411b. Furthermore, the first, second, and third spectrum modulation layers 410, 420, and 430 may have different thicknesses. As described above, the filters F1, F2, and F3 with gradually (substantially uniformly) changing transmittance spectrums may be formed by differently setting the thicknesses of the first, second, and third spectrum modulation layers 410, 420, and 430 and mixing ratios between the two types of quantum dots 411a and 411b.

Figure 24:
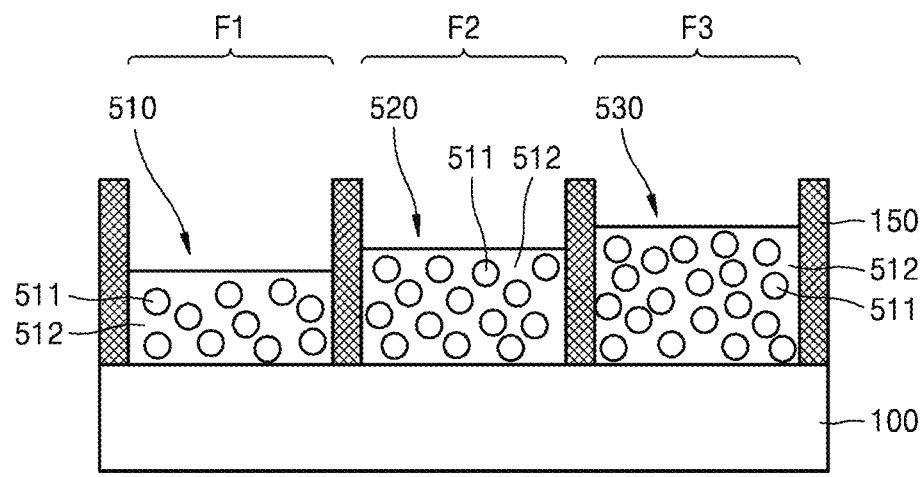

FIG. 24 is a cross-sectional view illustrating a composition of materials of a filter array of a multi-arrangement type filter array, according to an example embodiment.

Referring to FIG. 24, a filter array includes a plurality of filters F1, F2, and F3 arranged in an array. The first, second, and third filters F1, F2, and F3 may respectively include first, second, and third spectrum modulation layers 510, 520, and 530. The first, second, and third spectrum modulation layers 510, 520, and 530 may each include quantum dots 511 and an organic material 512. Here, the quantum dots 511 may be one type of quantum dots. The quantum dots 511 may be dispersed in the organic material 512. The organic material 512 may include a monomer or a polymer. For example, the organic material 512 may include poly(2-methoxy-5-(2-ethylhexyloxy)-1,4-phenylenevinylene) (MEH-PPV), poly(3-hexylthiophene) (P3HT), or the like, but embodiments are not limited thereto and the organic material 512 may include other various types of organic materials.

The first, second, and third spectrum modulation layers 510, 520, and 530 may have different thicknesses and thus different transmittance spectrums may be formed. Here, the thicknesses of the first, second, and third spectrum modulation layers 510, 520, and 530 may be changed using at least one of the quantum dots 511 and the organic material 512.

Figure 25:
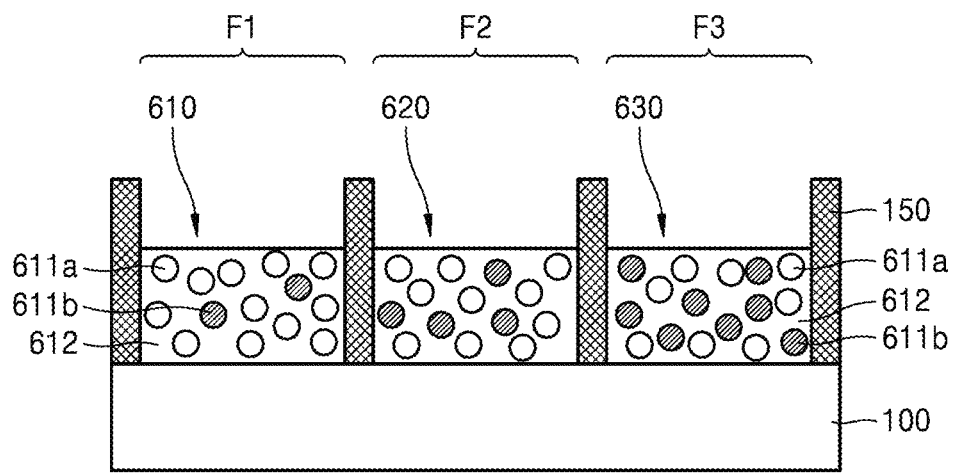

FIG. 25 is a cross-sectional view illustrating a composition of materials of a filter array of a multi-arrangement type filter array, according to an example embodiment.

Referring to FIG. 25, a filter array includes a plurality of filters F1, F2, and F3. The first, second, and third filters F1, F2, and F3 may respectively include first, second, and third spectrum modulation layers 610, 620, and 630. The first, second, and third spectrum modulation layers 610, 620, and 630 may have the same thickness. Each of the first, second, and third spectrum modulation layers 610, 620, and 630 may include quantum dots 611a and 611b and an organic material 612. The quantum dots 611a and 611b may include two types of quantum dots 611a and 611b, i.e., first and second quantum dots 611a and 611b. The two types of quantum dots 611a and 611b may be dispersed in the organic material 612. The organic material 612 may include a monomer or a polymer. For example, the organic material 612 may include poly(2-methoxy-5-(2-ethylhexyloxy)-1,4-phenylenevinylene) (MEH-PPV), poly(3-hexylthiophene) (P3HT), or the like, but embodiments are not limited thereto and the organic material 612 may include other various types of organic materials.

In the first, second, and third spectrum modulation layers 610, 620, and 630, mixing ratios between materials thereof may be different. That is, in the first, second, and third spectrum modulation layers 610, 620, and 630, mixing ratios between at least two among the first quantum dots 611a, the second quantum dots 611b, and the organic material 612 may be different. In detail, in the first, second, and third spectrum modulation layers 610, 620, and 630, mixing ratios between the first and second quantum dots 611a and 611b may be different. Alternatively, in the first, second, and third spectrum modulation layers 610, 620, and 630, mixing ratios between at least one of the first and second quantum dots 611a and 611b and the organic material 612 may be different. Alternatively, each of the spectrum modulation layers 610, 620, and 630 may include three or more types of quantum dots and an organic material. Here, a case in which the first, second, and third spectrum modulation layers 610, 620, and 630 have the same thickness but mixing ratios between materials thereof are different has been described above as an example but the spectrum modulation layers 610, 620, and 630 may be different in terms of both a thickness and a mixing ratio between the materials thereof.

Figure 26:
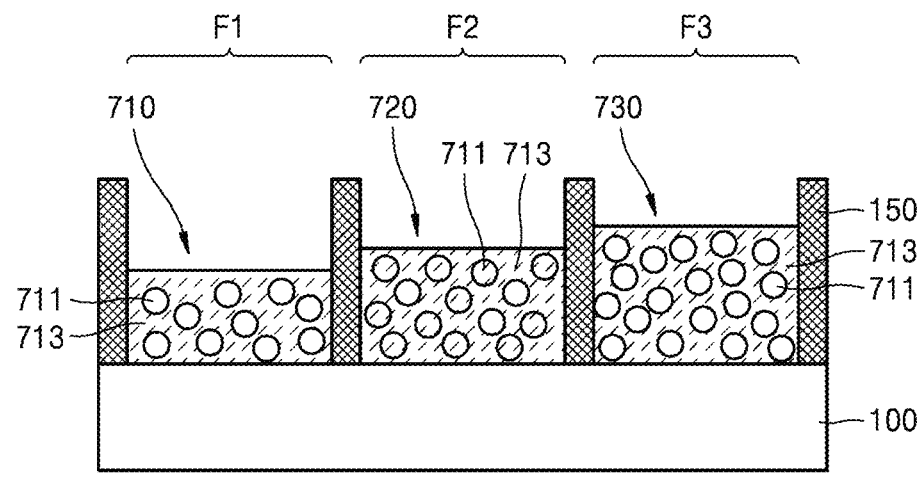

FIG. 26 is a cross-sectional view illustrating a composition of materials of a filter array of a multi-arrangement type filter array, according to an example embodiment.

Referring to FIG. 26, a filter array includes a plurality of filters F1, F2, and F3 arranged in an array, and the first, second, and third filters F1, F2, and F3 respectively includes first, second, and third spectrum modulation layers 710, 720, and 730. Each of the first, second, and third spectrum modulation layers 710, 720, and 730 may include quantum dots 711 and an inorganic material 713. Here, the quantum dots 711 may include one type of quantum dots. The quantum dots 711 may be dispersed in the inorganic material 713. The inorganic material 713 may include, for example, a Group VI semiconductor material, a Group III-V compound semiconductor material, or a Group II-VI compound semiconductor material. However, embodiments are not limited thereto and the inorganic material 713 may include other various types of materials.

The first, second, and third spectrum modulation layers 710, 720, and 730 may have different thicknesses. The thicknesses of the first, second and third spectrum modulation layers 710, 720, and 730 may be changed using at least one of the quantum dots 711 and the inorganic material 713. The filters F1, F2, and F3 with different transmittance spectrums may be formed by changing the thicknesses of the first, second, and third spectrum modulation layers 710, 720, and 730 including the quantum dots 711 and the inorganic material 713.

Figure 27:
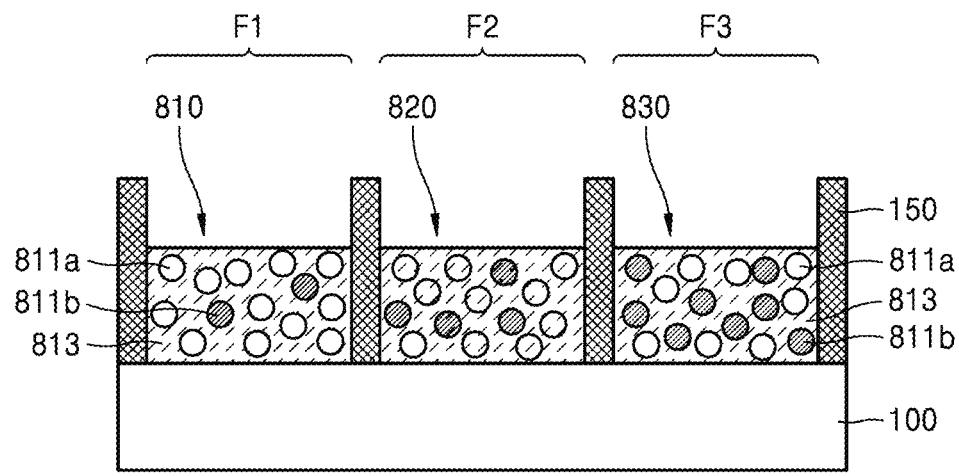

FIG. 27 is a cross-sectional view illustrating a composition of materials of a filter array of a multi-arrangement type filter array, according to an example embodiment.

Referring to FIG. 27, a filter array includes a plurality of filters F1, F2, and F3 and the first, second, and third filters F1, F2, and F3 respectively include first, second, and third spectrum modulation layers 810, 820, and 830. Each of the first, second, and third spectrum modulation layers 810, 820, and 830 may include quantum dots 811a and 811b and an inorganic material 813. The quantum dots 811a and 811b may include two types of quantum dots, i.e., first and second quantum dots 811a and 811b. The quantum dots 811a and 811b may be dispersed in the inorganic material 813. In order to form the plurality of filters F1, F2, and F3 with different transmittance spectrums, the first, second, and third spectrum modulation layers 810, 820, and 830 may be provided such that mixing ratios between materials thereof are different. That is, the first, second, and third spectrum modulation layers 810, 820, and 830 may be provided such that mixing ratios between at least two among the first quantum dots 811a, the second quantum dots 811b and the inorganic material 813 are different. As an example, the first, second, and third spectrum modulation layers 810, 820, and 830 may be provided such that mixing ratios between the first and second quantum dots 811a and 811b are different. The first, second, and third spectrum modulation layers 810, 820, and 830 may have substantially the same thickness but the mixing ratios between materials thereof may be different as the thicknesses thereof are changed.

Figure 28:
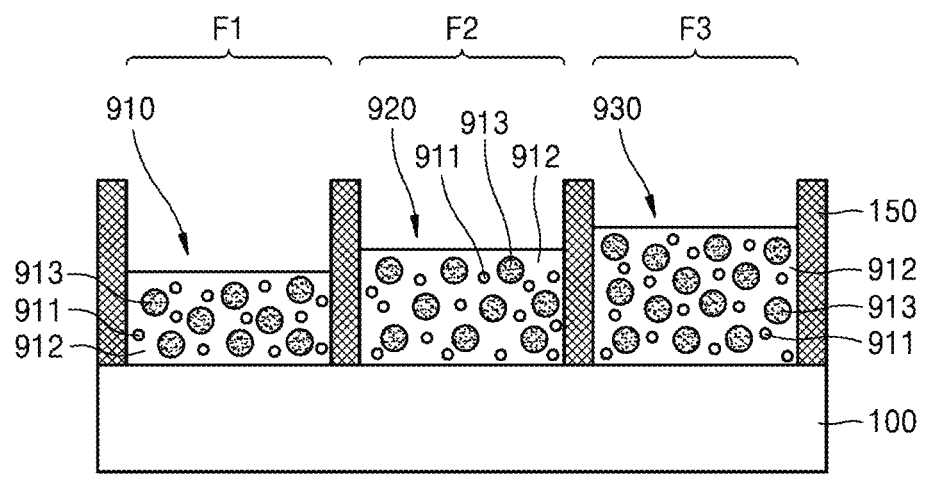

FIG. 28 is a cross-sectional view illustrating a composition of materials of a filter array of a multi-arrangement type filter array, according to an example embodiment.

Referring to FIG. 28, a filter array includes a plurality of filters F1, F2, and F3, and the first, second, and third filters F1, F2, and F3 respectively include first, second, and third spectrum modulation layers 910, 920, and 930. Each of the first, second, and third spectrum modulation layers 910, 920, and 930 may include quantum dots 911, an inorganic material 913 and an organic material 912. Here, the quantum dots 911 may be one type of quantum dots. The inorganic material 913 may include, for example, a Group VI semiconductor material, a Group III-V compound semiconductor material, or a Group II-VI compound semiconductor material but is not limited thereto. The inorganic material 913 may be in the form of nanoparticles or a form similar to the form of the nanoparticles. The organic material 912 may include a monomer or a polymer. For example, the organic material 912 may include poly(2-methoxy-5-(2-ethylhexyloxy)-1,4-phenylenevinylene) (MEH-PPV), poly(3-hexylthiophene) (P3HT), or the like but is not limited thereto. The first, second, and third spectrum modulation layers 910, 920, and 930 may have different thicknesses. Here, the thicknesses of the first, second, and third spectrum modulation layers 910, 920, and 930 may be changed using at least one among the quantum dots 911, the inorganic material 913 and the organic material 912. As described above, the filters F1, F2, and F3 with different transmittance spectrums may be formed by changing the thicknesses of the first, second, and third spectrum modulation layers 910, 920, and 930 each including the quantum dots 911, the inorganic material 913, and the organic material 912.

A case in which the spectrum modulation layers 910, 920, and 930 include one type of quantum dots has been described above but the spectrum modulation layers 910, 920, and 930 may include two or more types of quantum dots. In this case, the filters F1, F2, and F3 with different transmittance spectrums may be formed by differently setting mixing ratios between at least two among materials (i.e., two or more types of quantum dots, an inorganic material and a polymer) of the spectrum modulation layers 910, 920, and 930. Here, the thicknesses of the spectrum modulation layers may be uniform or different.

Figure 29:
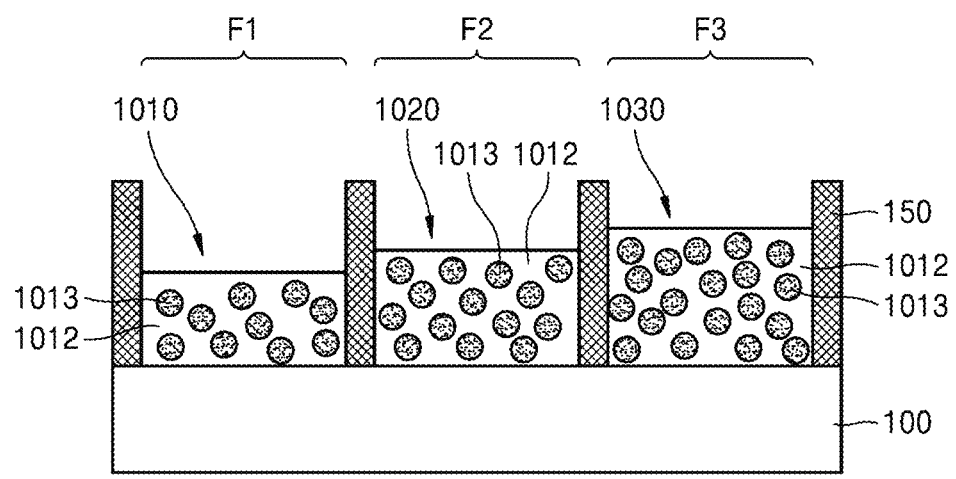

FIG. 29 is a cross-sectional view illustrating a composition of materials of a filter array of a multi-arrangement type filter array, according to an example embodiment.

Referring to FIG. 29, a filter array includes a plurality of filters F1, F2, and F3, and the first, second, and third filters F1, F2, and F3 respectively include first, second, and third spectrum modulation layers 1010, 1020, and 1030. Each of the first, second, and third spectrum modulation layers 1010, 1020, and 1030 may include an inorganic material 1013 and an organic material 1012. The inorganic material 1013 may be in the form of nanoparticles or another form. The first, second, and third spectrum modulation layers 1010, 1020, and 1030 may have different thicknesses. The plurality of filters F1, F2, and F3 may form different transmittance spectrums. The thicknesses of the first, second, and third spectrum modulation layers 1010, 1020, and 1030 may be changed using at least one of the inorganic material 1013 and the organic material 1012. As described above, the filters F1, F2, and F3 may form gradually (generally uniformly) changing transmittance spectrums by changing the thicknesses of the first, second, and third spectrum modulation layers 1010, 1020, and 1030 each including the inorganic material 1013 and the organic material 1012.

A case in which different transmittance spectrums are formed by changing the thicknesses of the first, second, and third spectrum modulation layers 1010, 1020, and 1030 each including the inorganic material 1013 and the organic material 1012 has been described above but different transmittance spectrums may be formed by changing mixing ratios between materials, i.e., the inorganic material 1013 and the organic material 1012, of the spectrum modulation layers 1010, 1020, and 1030. In this case, the thicknesses of the spectrum modulation layers 1010, 1020, and 1030 may be uniform or different.

Figure 30:
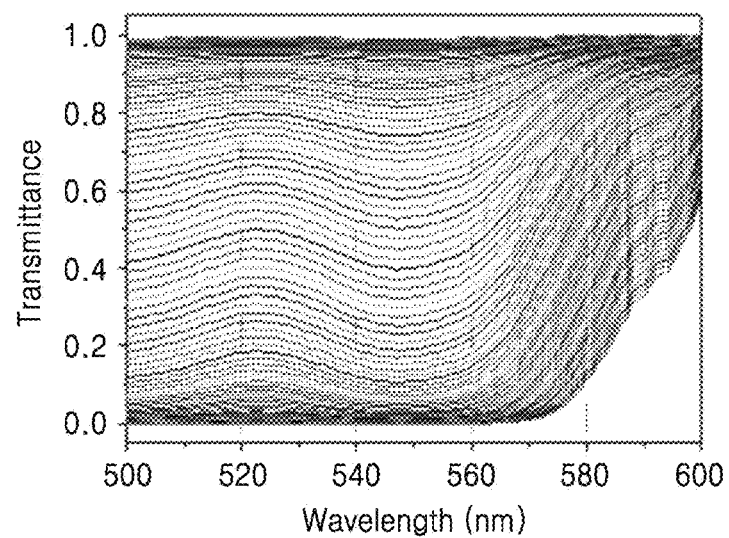
FIG. 30 is a result of a simulation showing transmittance spectrums of filters using one type of quantum dots and having adjusted thicknesses.

FIG. 30 is a result of a simulation showing transmittance spectrums of filters which use one type of quantum dots and have adjusted thicknesses. Here, CdSe particles having a diameter of 5 nm was used as the one type of quantum dots, and 100 spectrum modulation layers were formed by changing the thicknesses of the filters by 30 nm to be within a range of 10 nm to 3 μm.

Referring to FIG. 30, in the filters using the one type of quantum dots and having the adjusted thicknesses, 100 transmittance spectrums were formed to be uniformly changed within a wavelength range of about 500 nm to 600 nm. Accordingly, a spectrometer with high resolution, for example, a resolution of 1 nm or less, may be obtained.

Figure 31:
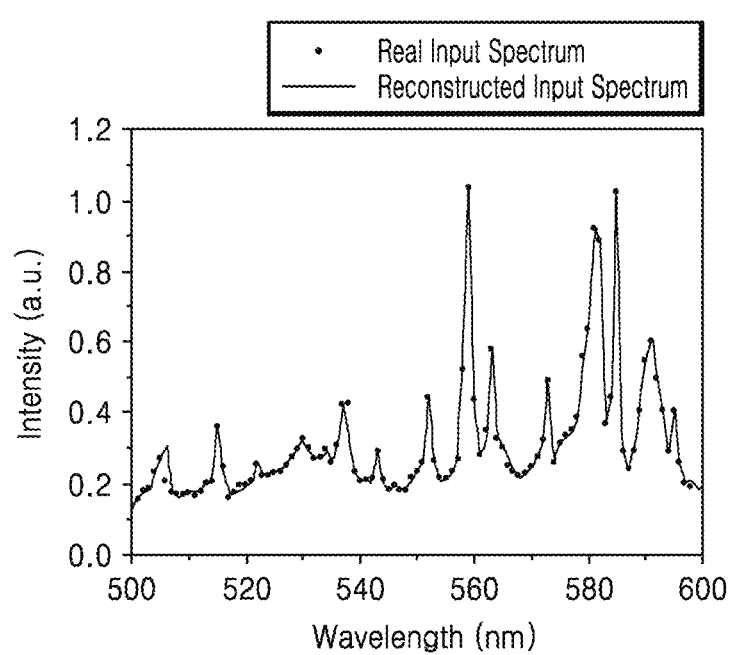
FIG. 31 is a graph showing a result of comparing a real input spectrum with an input spectrum reconstructed from the result of the simulation of FIG. 30.

FIG. 31 is a graph showing a result of comparing a real input spectrum with an input spectrum reconstructed from the result of the simulation of FIG. 30.

Referring to FIG. 31, the reconstructed input spectrum was substantially the same as a spectrum actually input to filters. A deviation between the real input spectrum and the reconstructed input spectrum was about 1% and was thus very small. Thus, an actually input spectrum may be exactly measured from the reconstructed input spectrum.

Figure 32:
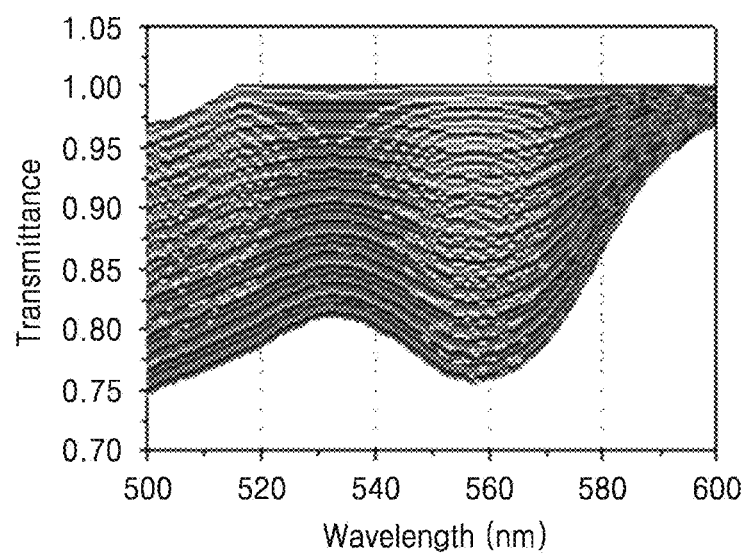
FIG. 32 is a result of a simulation showing transmittance spectrums of filters using two types of quantum dots and having adjusted quantum-dot mixing ratios.

FIG. 32 is a result of a simulation showing transmittance spectrums of filters using two types of quantum dots and having adjusted quantum-dot mixing ratios. Here, CdSe particles having a diameter of 5 nm and CdSe particles having a diameter of 4 nm were used as the two types of quantum dots. 100 spectrum modulation layers were formed by changing mixing ratios between the two types of quantum dots to 0.01:0.99, 0.02:098, . . . , 0.99:0.01, and 1.00:0.00.

Referring to FIG. 32, in the filters using the two types of quantum dots and having the adjusted quantum-dot mixing ratios, 100 transmittance spectrums were formed to uniformly change within a wavelength range of about 500 nm to 600 nm. Thus, a spectrometer with high resolution may be realized.

Figure 33:
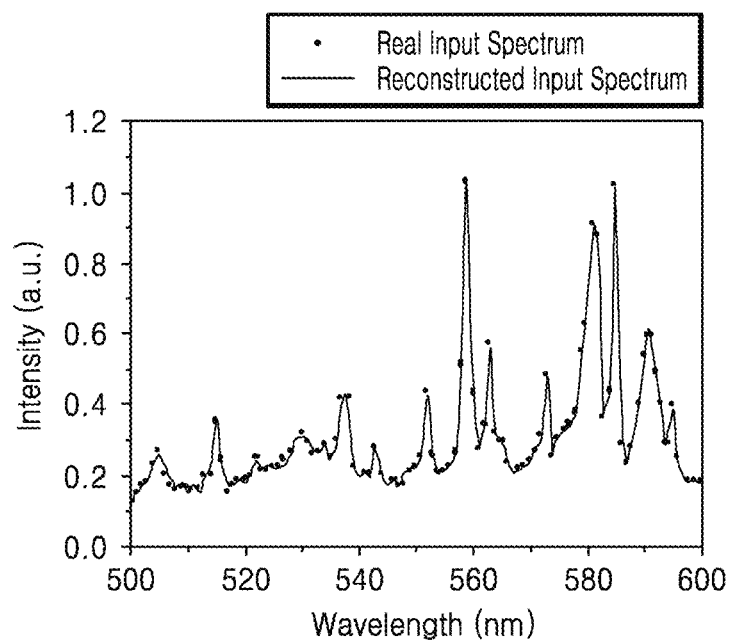
FIG. 33 is a graph showing a result of comparing a real input spectrum with an input spectrum reconstructed from the result of the simulation of FIG. 32.

FIG. 33 is a graph showing a result of comparing a real input spectrum with an input spectrum reconstructed from the result of the simulation of FIG. 32.

Referring to FIG. 33, the reconstructed input spectrum was substantially the same as a spectrum actually input to filters. A deviation between the real input spectrum and the reconstructed input spectrum were about 1% to 2% and were thus very small. Thus, an actually input spectrum may be exactly measured from the reconstructed input spectrum.

In FIGS. 30 and 32, "transmittance spectrums change gradually or substantially uniformly" may be understood to mean that a profile of an N-th transmittance spectrum and a profile of an (N+1)-th transmittance spectrum among a plurality of transmittance spectrums are similar and the difference (change) between the profiles is 15% or less or 10% or less. The plurality of transmittance spectrums may have a smooth curved shape, i.e., a non-linear shape, which does not have spike peaks or peaks corresponding to narrow bands. A change in the profiles of the transmittance spectrums may appear on the graph in a roughly horizontal direction. When transmittance spectrums are formed to change gradually or substantially uniformly as described above, spectrums may be measured and analyzed with high precision. When transmittance spectrums are formed in a linear shape to be in parallel to each other or cross each other, the precision of measurement/analysis may not be easy to secure.

Figure 34:
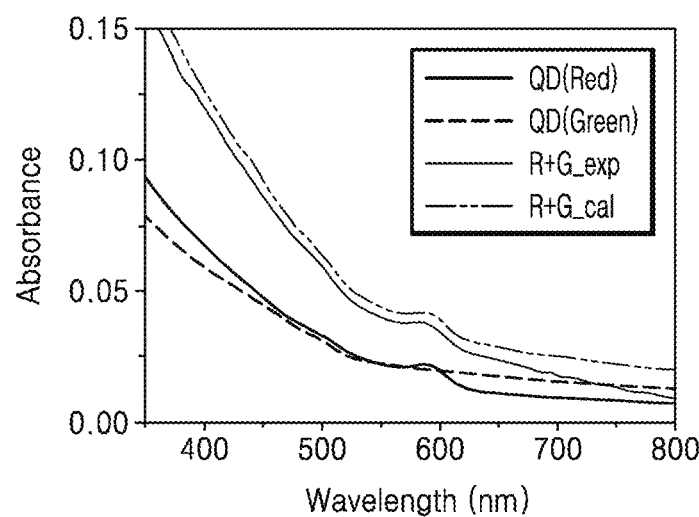
FIG. 34 is a graph comparing a result of experimentally measuring an absorbance spectrum when multiple films using two types of quantum dots were arranged with a result of theoretically calculating an absorbance spectrum.

FIG. 34 is a graph comparing a result of experimentally measuring an absorbance spectrum when multiple films of two types of quantum dots were arranged with a result of theoretically calculating an absorbance spectrum. In FIG. 34, "QD (Red)" represents a result obtained with respect to a first quantum-dot single film layer, "QD (Green)" represents a result obtained with respect to a second quantum-dot single film layer, "R+G_exp" represents experimental values obtained with respect to first and second quantum-dot multi-film structures, and "R+G_cal" represents calculation values obtained with respect to first and second quantum-dot multi-film structures.

Referring to FIG. 34, the R+G_exp representing a result of experimentally measuring absorbance spectrums of the quantum-dot multi-films and the R+G_cal representing a result of theoretically calculating absorbance spectrums are substantially the same.

Figure 35:
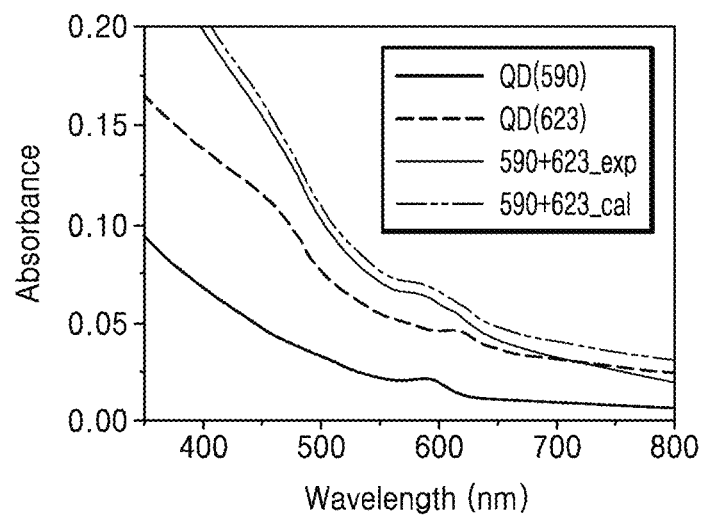
FIG. 35 is a graph comparing a result of experimentally measuring an absorbance spectrum obtained when multiple films using two types of quantum dots were arranged with a result of theoretically calculating an absorbance spectrum.

A graph of FIG. 35 shows results similar to those of the graph of FIG. 34. In FIG. 35, "QD (590)" represents a result obtained with respect to a third quantum-dot single film layer, "QD (623)" represents a result obtained with respect to a fourth quantum-dot single film layer, "590+623 _exp" represents experimental values obtained with respect to third and fourth quantum-dot multi-film structures, and "590+623_ cal" represents values obtained by calculating the third and fourth quantum-dot multi-film structures. Similarly, in FIG. 35, the experimental values 590+623_ exp and the calculation values 590+623_ cal are substantially the same.

According to the above-described example embodiments, a multi-arrangement type filter array capable of improving luminous efficiency and photosensitivity, and a spectral detector including the same may be achieved. Since the number of filters to be used may be deceased, a manufacturing process may be simplified and costs may be decreased. Furthermore, the efficiency of measuring spectrums may be increased and high resolution may be achieved. With the use of the filter array and the spectral detector, a spectrometer with high performance may be manufactured. In particular, a spectrometer may be manufactured in a small size.

In an existing spectroscopic method using a grating structure, diffracted light needs to be spread through a wide space to secure a resolution. Thus, it is difficult to reduce the size of a spectrometer when this method is used. When a plurality of optical filters having a resonant mirror-spacer-mirror structure (Fabry-Perot interferometer) is used, a wavelength of light may be shifted according to an incidence angle of incident light and a large number of filters have to be very finely and precisely manufactured. Thus, this method may be difficult to perform and manufacturing costs may increase. In contrast, according to an example embodiment of the present disclosure, the numbers of filters and sensors needed to achieve a desired resolution may be significantly reduced, a plurality of filters may be easily manufactured, and an influence of an incidence angle of incident light may be negligible. Accordingly, example embodiments may be advantageous in various aspects, including an easy process, cost saving, an improvement in resolution, an improvement in efficiency, a reduction in element (device) size, etc.

A multi-arrangement type filter array and a spectral detector (device) including the same according to embodiments as described above are applicable to not only a spectrometer but also other various types of optical devices. A small-sized spectrometer may be very usefully applicable to various fields. For example, a small-sized spectrometer may be used in a portable and small-sized bio-sensor or a gas detector, and particularly, when high-sensitive photon measurement is needed, e.g., a Raman device for glucose measurement. A spectrometer employing quantum dots is not (or less) influenced by an incidence angle and may be thus useful for closest precision measurement. However, the field of various example embodiments of the present disclosure is not limited to small-sized spectrometers or quantum-dot spectrometers and may be variously changed.

While many matters have been described in detail in the above description, they are not intended to restrict the scope of the inventive concept but should be understood as examples of embodiments. For example, it will be apparent to those of ordinary skill in the art that many changes may be made in the structures of a filter array, a spectral detector and a spectrometer described above with reference to FIGS. 1 to 3, 5, 6, and 8 to 29. Furthermore, various changes may be made in methods of manufacturing the filter array and the spectral detector and methods of operating the filter array and the spectral detector. In some cases, relative arrangements of filters of multi-arrangement type filter arrays may be changed according to an optical method without moving the multi-arrangement type filter arrays in a state in which the multi-arrangement type filter arrays are fixed. Furthermore, the multi-arrangement type filter arrays may be used without changing the relative arrangement. In addition, other various modifications and changes may be made. Accordingly, the scope of the present disclosure should be determined not by the example embodiments set forth herein but by the technical idea defined in the appended claims.

When a plurality of filters are described as having "different" thicknesses, it means that at least two filters of the plurality of filters have different thicknesses from each other. In other words, a plurality of filters having different thicknesses signify that the filters do not have a uniform thickness. Conversely, when a plurality of filters are described as having the "same" thickness, it means that every filter in the plurality of filters has a substantially identical thickness. In other words, the plurality of filters have a uniform thickness. Similarly, the plurality of filters having "different" materials or "same" materials correspond to filters made out of heterogeneous materials and a homogeneous material, respectively.

What is claimed is:

1. A spectral detector comprising:
a multi-arrangement type filter array including a plurality of filter arrays arranged to overlap each other in a path of propagation of incident light; and
a sensor array including a plurality of sensors configured to sense light passing through the multi-arrangement type filter array,
wherein the multi-arrangement type filter array comprises:
a first filter array having a first structure in which a plurality of first filters with different transmittance spectrums according to different absorbance characteristics thereof are arranged; and
a second filter array having a second structure in which a plurality of second filters with different transmittance spectrums according to different absorbance characteristics thereof are arranged, the plurality of second filters of the second filter array being arranged to at least partially overlap the plurality of first filters of the first filter array at a first position relative to the first filter array so that the multi-arrangement type filter array has a first set of absorbance characteristics,
wherein the plurality of second filters of the second filter array is configurable to be arranged to at least partially overlap the plurality of first filters of the first filter array at a second position relative to the first filter array so that the multi-arrangement type filter array has a second set of absorbance characteristics different from the first set of absorbance characteristics,
wherein the incident light has a plurality of parts that pass through the plurality of first filters, respectively, and
wherein the plurality of second filters that overlap with the plurality of first filters are respectively arranged in paths of the plurality of parts of the incident light,
wherein at least one of the first filter array and the second filter array is configured to be movable, and
wherein a match combination between the plurality of first filters and the plurality of second filters is changed by moving the at least one of the first filter array and the second filter array.

2. The spectral detector of claim 1, wherein at least one of the plurality of first filters and the plurality of second filters has at least one of different thicknesses and different mixing ratios of materials.

3. The spectral detector of claim 1, wherein the plurality of first filters comprise substantially a same material and have different thicknesses, and
wherein the plurality of second filters comprise substantially a same material and have different thicknesses.

4. The spectral detector of claim 3, wherein a first degree of change in first thicknesses of the plurality of first filters is different from a second degree of change in second thicknesses of the plurality of second filters, and
wherein a largest thickness among the first thicknesses of the plurality of first filters is different from a largest thickness among the second thicknesses of the plurality of second filters.

5. The spectral detector of claim 3, wherein the plurality of first filters comprise a first type of quantum dots,
wherein the plurality of second filters comprise a second type of quantum dots, and wherein the first type of quantum dots and the second type of quantum dots are of one of a same type of quantum dot and different types of quantum dots.

6. The spectral detector of claim 1, wherein at least one of the plurality of first filters and the plurality of second filters has different mixing ratios between at least two materials thereof.

7. The spectral detector of claim 6, wherein a first degree of change in first mixing ratios between at least two materials of the plurality of first filters is different from a second degree of change in second mixing ratios between at least two materials of the plurality of second filters, and
   a largest mixing ratio among the first mixing ratios between the at least two materials of the plurality of first filters is different from a largest mixing ratio among the second mixing ratios between the at least two materials of the plurality of second filters.

8. The spectral detector of claim 6, wherein at least one of the plurality of first filters and the plurality of second filters has a same thickness.

9. The spectral detector of claim 6, wherein at least two types of quantum dots are mixed in different ratios in at least one of the plurality of first filters and the plurality of second filters.

10. The spectral detector of claim 1, wherein the plurality of first filters comprise a same first material and have different thicknesses, and
    wherein the plurality of second filters comprise a same second material and have different thicknesses.

11. The spectral detector of claim 10, wherein the same first material comprises a first quantum dot, and
    wherein the same second material comprises a second quantum dot different from the first quantum dot.

12. The spectral detector of claim 1, wherein at least one of the plurality of first filters and the plurality of second filters comprises at least one of quantum dots, nanoparticles, an organic material, and an inorganic material,
    wherein the nanoparticles are different from the at least one of quantum dots, and
    wherein the inorganic material is different from the at least one of quantum dots and the nanoparticles.

13. The spectral detector of claim 1, further comprising an anti-reflection layer provided on a top surface of each of the plurality of first filters.

14. The spectral detector of claim 1, wherein the plurality of filter arrays further comprise a third filter array of a plurality of third filters with different transmittance spectrums, the third filter array being arranged to at least partially overlap the second filter array, and
    wherein the plurality of third filters have at least one of different thicknesses and different mixing ratios of materials.

15. The spectral detector of claim 14, wherein the plurality of filter arrays further comprise at least one additional filter array arranged to at least partially overlap the third filter array.

16. A spectrometer comprising the spectral detector of claim 1.

17. A spectral detector comprising:
    a multi-arrangement type filter array including a plurality of filter arrays arranged to overlap each other in a path of propagation of incident light; and
    a sensor array including a plurality of sensors configured to sense light passing through the multi-arrangement type filter array,
    wherein the multi-arrangement type filter array comprises:
    a first filter array having a first structure in which a plurality of first filters with different transmittance spectrums according to different absorbance characteristics thereof are arranged; and
    a second filter array having a second structure in which a plurality of second filters with different transmittance spectrums according to different absorbance characteristics thereof are arranged, the plurality of second filters of the second filter array being arranged to at least partially overlap the plurality of first filters of the first filter array at a first position relative to the first filter array so that the multi-arrangement type filter array has a first set of absorbance characteristics,
    wherein the plurality of second filters of the second filter array is configurable to be arranged to at least partially overlap the plurality of first filters of the first filter array at a second position relative to the first filter array so that the multi-arrangement type filter array has a second set of absorbance characteristics different from the first set of absorbance characteristics,
    wherein the incident light has a plurality of parts that pass through the plurality of first filters, respectively, and
    wherein the plurality of second filters that overlap with the plurality of first filters are respectively arranged in paths of the plurality of parts of the incident light,
    wherein the spectral detector further comprises at least one of:
    a first position moving member, including one or more motors, configured to move positions of at least some of the plurality of first filters, the first position moving member being coupled to the first filter array; and
    a second position moving member, including one or more motors, configured to move positions of at least some of the plurality of second filters, the second position moving member being coupled to the second filter array.

18. A multi-arrangement type filter array comprising a plurality of filter arrays arranged to overlap each other in a path of propagation of incident light, the plurality of filter arrays comprising:
    a first filter array having a first structure in which a plurality of first filters with different transmittance spectrums according to different absorbance characteristics thereof are arranged; and
    a second filter array having a second structure in which a plurality of second filters with different transmittance spectrums according to different absorbance characteristics thereof are arranged, the plurality of second filters of the second filter array being arranged to at least partially overlap the plurality of first filters of the first filter array at a first position relative to the first filter array so that the multi-arrangement type filter array has a first set of absorbance characteristics,
    wherein the plurality of second filters of the second filter array is configurable to be arranged to at least partially overlap the plurality of first filters of the first filter array at a second position relative to the first filter array so that the multi-arrangement type filter array has a second set of absorbance characteristics different from the first set of absorbance characteristics, wherein the incident light has a plurality of parts that pass through the plurality of first filters, respectively, and wherein the plurality of second filters that overlap with the plurality of first filters are respectively arranged in paths of the plurality of parts of the incident light, wherein at least one of the first filter array and the second filter array is configured to be movable, and wherein a match combination between the plurality of first filters and the plurality of second filters is changed by moving the at least one of the first filter array and the second filter array.

19. The multi-arrangement type filter array of claim 18, wherein at least one of the plurality of first filters and the plurality of second filters has at least one of different thicknesses and different mixing ratios of materials.

20. The multi-arrangement type filter array of claim 18, wherein at least one of the plurality of first filters comprise a first type of quantum dots and have different thicknesses, wherein the plurality of second filters comprise a second type of quantum dots and have different thicknesses, and wherein the first type of quantum dots and the second type of quantum dots are of one of a same type of quantum dot and different types of quantum dots.

21. The multi-arrangement type filter array of claim 18, wherein at least one of the plurality of first filters and the plurality of second filters has different mixing ratios between at least two types of quantum dots.

22. The multi-arrangement type filter array of claim 18, wherein at least one of the plurality of first filters and the plurality of second filters comprises at least one of quantum dots, nanoparticles, an organic material, and an inorganic material.

23. The multi-arrangement type filter array of claim 18, wherein the plurality of filter arrays further comprise at least one additional filter array arranged to at least partially overlap the second filter array.

* * * * *